US008189229B2

(12) United States Patent
Mori

(10) Patent No.: US 8,189,229 B2
(45) Date of Patent: May 29, 2012

(54) IMAGE PROCESSING METHOD, IMAGE PROCESSING APPARATUS AND PROGRAM FOR IMAGE POSITION CORRECTION PROCESSING

(75) Inventor: Yasuo Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1549 days.

(21) Appl. No.: 11/330,214

(22) Filed: Jan. 12, 2006

(65) Prior Publication Data

US 2006/0171002 A1   Aug. 3, 2006

(30) Foreign Application Priority Data

Jan. 31, 2005   (JP) .................................. 2005-023933

(51) Int. Cl.
G06K 15/00 (2006.01)
G06F 15/00 (2006.01)

(52) U.S. Cl. ......................... 358/1.18; 358/1.16; 358/1.9

(58) Field of Classification Search ........................ None
See application file for complete search history.

(56) References Cited

U.S. PATENT DOCUMENTS

| 5,093,653 | A |   | 3/1992 | Ikehira |   |
|---|---|---|---|---|---|
| 5,483,606 | A |   | 1/1996 | Denber |   |
| 5,907,631 | A | * | 5/1999 | Saitoh | 382/176 |
| 6,959,121 | B2 |   | 10/2005 | Kumazawa |   |
| 7,359,083 | B2 | * | 4/2008 | Salgado | 358/1.18 |
| 2002/0025081 | A1 | * | 2/2002 | Kumazawa | 382/289 |
| 2003/0053096 | A1 | * | 3/2003 | Nagata | 358/1.9 |
| 2003/0077001 | A1 | * | 4/2003 | Yamashita et al. | 382/276 |
| 2003/0103236 | A1 | * | 6/2003 | Kato | 358/1.15 |
| 2004/0133856 | A1 |   | 7/2004 | Miyazato et al. |   |
| 2004/0264805 | A1 | * | 12/2004 | Harada et al. | 382/282 |
| 2005/0243371 | A1 |   | 11/2005 | Kanaya et al. |   |
| 2005/0289460 | A1 |   | 12/2005 | Tomita et al. |   |

FOREIGN PATENT DOCUMENTS

| JP | 9-186854 | 7/1997 |
|---|---|---|
| JP | 11-341230 | 12/1999 |
| JP | 2002-056398 | 2/2002 |
| JP | 2002-084409 | 3/2002 |

* cited by examiner

*Primary Examiner* — King Poon
*Assistant Examiner* — Ming Hon
(74) *Attorney, Agent, or Firm* — Fitzpatrick, Cella, Harper & Scinto

(57) ABSTRACT

There is provided an image processing method enabling image position correction processing to be preferably performed after scan of a paper document and thereby capable of significantly reducing image correction processing cost required before printing, an image processing apparatus and a program. First, when document images constituted by multiple pages are inputted into a POD site environment 103 from an end user environment A (101A) or the like, the document images are divided into multiple blocks, for each page, and a circumscribed rectangle around the multiple blocks is calculated, with the use of a process management section 104, a prepress section 105, a digital print section 106 and a postpress section 107. Then, a standard value for the calculated circumscribed rectangles on respective pages is calculated. Based on difference between the circumscribed rectangle on each page and the standard value, the shift amount of the image on each page is calculated, and then the image is shifted based on the shift amount.

27 Claims, 31 Drawing Sheets

FIG. 29A

| NO | ATTRIBUTE INFORMATION | | REMARKS |
|---|---|---|---|
| 1 | PRINTING METHOD | SINGLE-SIDED / DOUBLE-SIDED / BOOK BINDING PRINTING | |
| 2 | SHEET SIZE | DOCUMENT / SIZE / FIXED SIZE | • WHEN OF "A4 + A3," "B4 + B3" OR "LETTER + LEISURE (11 × 17)" IS SPECIFIED, Z FOLD IS SPECIFIED.<br>• WHEN BOOKBINDING PRINTING OR N-UP PRINTING IS SPECIFIED, THE DOCUMENT SIZE OF THE FIRST CHAPTER / PAGE IS AUTOMATICALLY SELECTED. |
| 3 | SHEET DIRECTION | HORIZONTAL / VERTICAL | • SELECTABLE ONLY IN THE CASE OF FIXED SIZE |
| 4 | BINDING MARGIN, BINDING DIRECTION | | • SHIFT / ENLARGEMENT AND REDUCTION CAN BE SPECIFIED. |
| 5 | N-UP PRINTING | THE NUMBER OF PAGES / ARRANGEMENT ORDER / BORDER LINE / ARRANGEMENT POSITIONS, ETC. | • 9 PATTERNS OF ARRANGEMENT POSITION ARE PROVIDED.<br>• SAME SIZE PRINTING CAN BE SPECIFIED. |
| 6 | ENLARGEMENT / REDUCTION | ON / OFF | WHEN FIXED SIZE IS SELECTED AS SHEET SIZE OR N-UP PRINTING IS SELECTED, ON IS AUTOMATICALLY SPECIFIED. |
| 7 | WATERMARK | | • INDIVIDUAL SPECIFICATION FOR A LOGICAL PAGE OR A PHYSICAL PAGE IS POSSIBLE.<br>• ALL CHAPTERS / PAGES ARE TARGETED. |

FIG. 29B

| | | | |
|---|---|---|---|
| 8 | HEADER / FOOTER | | • INDIVIDUAL SPECIFICATION FOR A LOGICAL PAGE OR A PHYSICAL PAGE IS POSSIBLE.<br>• ALL CHAPTERS / PAGES ARE TARGETED. |
| 9 | SHEET DISCHARGE METHOD | STAPLING / PUNCH HOLES | • STAPLING / PUNCHING IS POSSIBLE ONLY FOR SINGLE-SIDED / DOUBLE-SIDED PRINTING.<br>• STAPLING IS PERFORMED FOR ONE OR TWO POSITIONS. |
| 10 | DETAILS OF BOOK BINDING | OPENING DIRECTION / SADDLE STITCH / SPECIFICATION OF ENLARGEMENT OR REDUCTION / BINDING MARGIN / SPECIFICATION OF SEPARATE BINDING, ETC. | • ONLY FOR BOOKBINDING PRINTING |
| 11 | FRONT COVER / BACK COVER | | • PRINTING SPECIFICATION FOR FRONT COVER 1/2 AND BACK COVER 1/2<br>• SPECIFICATION OF SHEET FEEDING PORT (INCLUDING INSERTER) |
| 12 | INDEX SHEET | | • PRINTING OF A CHARACTER STRING ON INDEX PORTION AND ANNOTATION ON INDEX SHEET CAN BE SET.<br>• SPECIFICATION IS IMPOSSIBLE FOR BOOKBINDING PRINTING. |
| 13 | SPLIT SHEET | | • SPECIFICATION OF SHEET FEEDING PORT (INCLUDING INSERTER)<br>• DOCUMENT DATA CAN BE PRINTED ON INSERTED SHEET.<br>• SPECIFICATION IS IMPOSSIBLE FOR BOOKBINDING PRINTING. |
| 14 | CHAPTER SEPARATOR | "NOTHING" / "PAGE CHANGE" / "SHEET CHANGE" | • "SHEET CHANGE" IS FIXED WHEN INDEX SHEET OR SLIP SHEET IS SPECIFIED.<br>• "SHEET CHANGE" IS SPECIFIED FOR SINGLE-SIDED PRINTING. |

FIG. 30

| NO | ATTRIBUTE INFORMATION | | REMARKS |
|---|---|---|---|
| 1 | SHEET SIZE | DOCUMENT SIZE / FIXED SIZE | • "SHEET CHANGE" IS AUTOMATICALLY SPECIFIED WHEN FIXED SIZE IS SELECTED.<br>• WHEN MULTIPLE SHEETS ARE SELECTED FOR BOOK, SHEET SIZE CAN BE CHANGED ONLY FOR SPECIFIED SHEETS. SHEET SIZE CAN BE CHANGED EVEN WHEN IT IS SPECIFIED TO BE IN ACCORDANCE WITH BOOK. |
| 2 | SHEET DIRECTION | VERTICAL / HORIZONTAL | • SELECTABLE ONLY IN THE CASE OF FIXED SIZE |
| 3 | SPECIFICATION OF N-UP PRINTING | THE NUMBER OF PAGES / ARRANGEMENT ORDER / BORDER LINE / ARRANGEMENT POSITION, ETC. | • 9 PATTERNS OF ARRANGEMENT POSITION ARE PROVIDED.<br>• SAME SIZE PRINTING CAN BE SPECIFIED. |
| 4 | ENLARGEMENT / REDUCTION | ON / OFF | • WHEN FIXED SIZE IS SELECTED AS SHEET SIZE OR N-UP PRINTING IS SELECTED, ON IS AUTOMATICALLY SPECIFIED. OFF CAN BE SPECIFIED. |
| 5 | WATERMARK | DISPLAY / NON-DISPLAY | • SPECIFICATION OF WHETHER OR NOT TO DISPLAY ALL WATERMARKS SPECIFIED IN BOOK |
| 6 | HEADER / FOOTER | DISPLAY / NON-DISPLAY | • SPECIFICATION OF WHETHER OR NOT TO DISPLAY ALL HEADERS AND FOOTERS SPECIFIED FOR BOOK |
| 7 | SHEET DISCHARGE METHOD | STAPLING | • WHEN STAPLING IS SPECIFIED FOR BOOK, OFF CAN BE SPECIFIED. ON IS SPECIFIED AS DEFAULT. |

IMAGE PROCESSING METHOD, IMAGE PROCESSING APPARATUS AND PROGRAM FOR IMAGE POSITION CORRECTION PROCESSING

FIELD OF THE INVENTION

The present invention relates to an image processing method for performing processing for electronically correcting image data read from an image input apparatus such as a scanner, an image processing apparatus and a program.

BACKGROUND OF THE INVENTION

In a so-called commercial printing industry where a reward is obtained from a third person by accepting an order of creation of a printed matter (such as a magazine, a newspaper, a catalogue, an advertisement and a photogravure) from the third person (a customer or a client), creating the printed matter desired by the third person and delivering it to the third person, there is mainly used a large scale printing apparatus such as an offset reproduction printing machine still now.

Conventionally, in the commercial printing industry, printing work has been performed through various processes such as document receiving, design or layout, comprehensive layout (presentation by printer output), proofing (layout modification or color modification), proof print, artwork creation, printing, post-processing and delivery. This is because artwork creation is indispensable to use such a printing machine as described above, and an elaborate proofing work, that is, an elaborate layout checking and color confirmation works are essential since modification of artwork once created is not easy and requires a high cost.

As described above, in such an industry, a large scale apparatus has been conventionally required, and a certain degree of time has been required to create a printed matter desired by a client. Furthermore, each of such works requires expert knowledge, and know-how of a skilled worker, a so-called artisan, is also required.

Meanwhile, recently, with realization of a higher speed and a higher quality of an electro-photography printing-apparatus or an ink jet printing apparatus, there appears a market called "print on demand" (hereinafter referred to as "POD") which aims at handling a large number of copies or jobs in a short period without using a large scale apparatus or system, in opposition to the printing industry as described above. POD is intended to realize a digital print with the use of electronic data and run a business therewith by making best use of a digital image forming apparatus, such as a digital copying machine and a digital complex machine, instead of using a conventional large scale printing machine or printing method described above.

In such a POD market, digitalization has been more promoted in comparison with the conventional printing industry, and management and control utilizing computers has been spread. The level of the market is gradually approaching that of the printing industry to some extent by utilizing a computer. Under such a background, there exist PFP (print for pay), which is said to be a printing service provided by a copy/print shop and a printing company, CRD (centralized reproduction department), which is said to be a printing service to be provided within a company, and the like.

In the conventional printing industry and the POD market as described above, though it has been considered to provide a service for performing all the works of order placement/receiving, packaging, delivery, after-the-sale service, inventory management and money receiving management of a printed matter as a commercial product, more consideration is necessary.

In the printing industry and the POD market as described above, though it has been considered to provide a system capable of supporting management planning and management works through collection, processing and report of production related data and accumulating information to provide it to a department which requires it as necessary, realization and operation of an optimum such system has not been actually realized yet.

Furthermore, in the actual situation of the above-described POD market, it is not so easy to employ a skilled worker as in the conventional printing industry. Therefore, in spite of demands for completing a job at a low cost, running a business with less investment, reducing TCO (total cost of ownership) and the like, such demands are not sufficiently responded to because it is a new market, and there are problems to be solved.

The receiving forms of document data for printing are mainly classified into electronic data and paper data. When a document is received as paper data, it is necessary to perform processing for acquiring the data with a scanner to digitize it. However, when a paper document is read with a scanner, correction of the image quality or distortion may be required, unlike the case of receiving electronic data.

This correction work requires time and therefore causes increase in cost. Accordingly, various techniques for correcting a scan image have been proposed. For example, there have been proposed a technique for correcting distortion which may be caused by paper warpage at the binding portion in the case of receiving a document which is bound in (see Japanese Patent Laid-Open No. 11-341230, for example) or a technique for taking a histogram based on the brightness of image data to adjust the color density of the image (see Japanese Patent Laid-Open 2002-84409, for example).

However, in the case of manually setting a paper document on a scanner or in the case of automatically scanning multiple sheets using an automatic document feeder (ADF), displacement may be still caused according to paper setting or feeding accuracy. Therefore, conventionally, when high quality output is required, such displacement has been manually corrected with the use of the above-described technique or an image editor by visually inspecting the screen of the image editor or a trial output of a printed matter, and this leads to increase in work cost.

Therefore, conventionally, even if position adjustment is performed, the position adjustment is often only adjustment of folio for which display displacement between the front side and the back side is noticeable, and alignment of the print position of pages is actually not performed.

SUMMARY OF THE INVENTION

The present invention has been made in consideration of the above situation, and its object is to provide an image processing method which enables image position correction processing after scan of a paper document to be preferably performed and, thereby, capable of significantly reducing image correction processing cost required before printing, an image processing apparatus and a program.

In order to solve the above problem the present invention is an image processing method for performing position adjustment of image data constituted by multiple pages which has been inputted; the method comprising:

a division step of dividing, for each page, the image data into areas which include an object to be rendered;

an adjustment value calculation step of calculating, for each page, an adjustment value for position adjustment, based on respective areas divided by the division step;

a shift amount calculation step of calculating the shift amount of the image data on each page, based on difference between the adjustment value of each page calculated by the adjustment value calculation step and a standard value for position adjustment; and a shifting step of shifting the image data on each page based on the shift amount calculated by the shift amount calculation step.

Furthermore, in order to solve the above problem, the present invention is an image processing apparatus which performs position adjustment of image data constituted by multiple pages which has been inputted; the method comprising:

division means for dividing, for each page, the image data into areas which include an object to be rendered;

adjustment value calculation means for calculating, for each page, an adjustment value for position adjustment, based on respective areas divided by the division means;

shift amount calculation means for calculating the shift amount of the image data on each page, based on difference between the adjustment value of each page calculated by the adjustment value calculation means and a standard value for position adjustment; and shifting means for shifting the image data on each page based on the shift amount calculated by the shift amount calculation means.

Furthermore, in order to solve the above problem, the present invention is a program for causing a computer to perform an image processing method for performing position adjustment of image data constituted by multiple pages which has been inputted; the program comprising:

a division procedure for dividing, for each page, the image data into areas which include an object to be rendered;

an adjustment value calculation procedure for calculating, for each page, an adjustment value for position adjustment, based on respective areas divided by the division procedure;

a shift amount calculation procedure for calculating the shift amount of the image data on each page, based on difference between the adjustment value of each page calculated by the adjustment value calculation procedure and a standard value for position adjustment; and a shifting procedure for shifting the image data on each page based on the shift amount calculated by the shift amount calculation procedure.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention

FIGS. 29A and 29B are lists showing examples of book attributes (document setting information 403); and FIG. 30 is a list showing an example of chapter attributes (chapter setting information 407).

DETAILED DESCRIPTION OF THE PREFERRED EMBODIMENTS

Configuration and operation of an information processing system according to an embodiment of the present invention will be described below in detail with reference to drawings.

Figure 1:
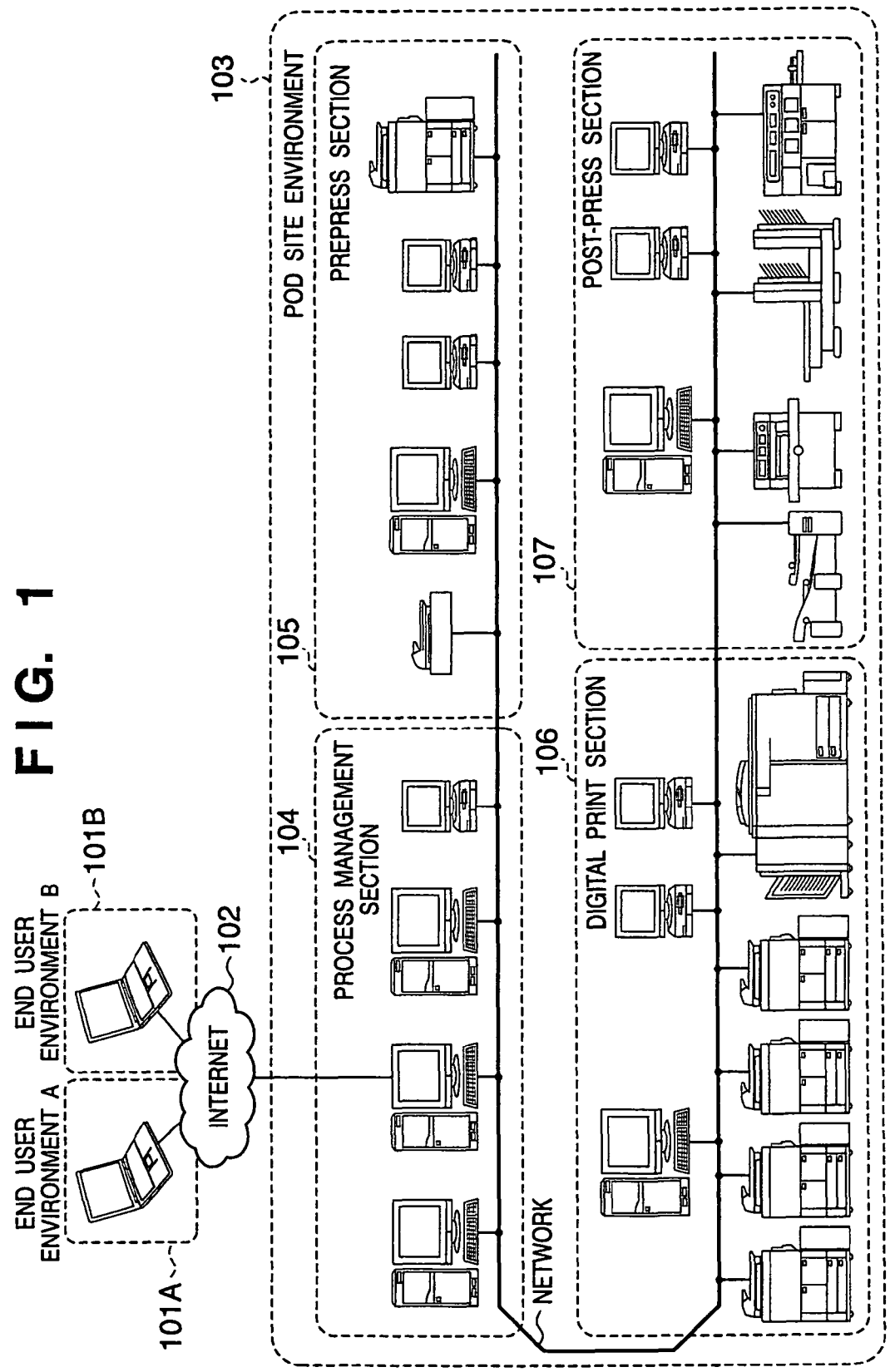
FIG. 1 is a block diagram showing an example of basic configuration of an entire image processing system according to an embodiment of the present invention.

FIG. 1 is a block diagram showing an example of basic configuration of the entire image processing system according to the embodiment of the present invention. The image processing system in this embodiment is configured by two end user environments 101A and 101B, and a POD (print on demand) site environment 103 connected to the end user environments via the Internet 102.

There exist orderers who place a print order in the end user environments, and they can request for a print job, confirm the status of the job and the like from their respective end user environments (the end user environment 101A and the end user environment 101B in FIG. 1), with the use of their respective client PC's.

In the POD site environment 103, processings are performed by four process execution sections of a process management section 104, a prepress section 105, a digital print section 106 and a post-press section 107.

The process management section 104 is a section which instructs a work to each of the process execution sections of the process management section 104, the prepress section 105, the digital print section 106 and the post-press section 107 in the POD site environment 103 and performs centralized management of the workflow of this system configured by computers and various devices. For example, the process management section 104 plays roles of receiving a job from the end user (orderer) of the end user environment described above, storing the job from the end user, assembling works at respective processes as a workflow based on a job instruction from the end user, or efficiently scheduling works by respective devices or respective workers.

The prepress section 105 plays a role of scanning a paper document received from an end user by means of a scanning device such as a scanner and an MFP based on a work instruction of a prepress job received from the process management section 104 and acquiring a scan image file into a prepress server or a client PC. Furthermore, the prepress section 105 also plays a role of performing image correction and file merge, page insertion/deletion, various page layout and editing or imposition processing, and a role of performing proof output for confirming the layout or colors of a final product as necessary.

The digital print section 106 plays a role of copying a paper document received from an end user by means of a scanning/print device such as a black-and-white MFP and a color MFP, in accordance with a work instruction of a print job received from the process management section 104 or the prepress section 105. Furthermore, the digital print section 106 also plays a role of outputting a document/image file received from an end user, which has been sent from a client PC via a printer driver or a hot folder, a scan image file scanned by means of a scanning device, or a document/image file obtained by editing such a file, to a printing device such as a white-and-black MFP and a color MFP.

The post-press section 107 plays a role of controlling post-processing devices such as a paper folding machine, a saddle stitching machine, a case binding machine, paper cutting machine, an insertion machine and a gathering machine in accordance with a work instruction of a post-press job received from the process management section 104, the prepress section 105 or the digital print section 106. Furthermore, the post-press section 107 also plays a role of performing finish processings such as paper folding, saddle stitching, case binding, paper cutting, insertion and gathering for recording paper outputted from the digital print section 106.

Detailed description will be made below on the process management section 104, the prepress section 105 and the digital print section 106 which are especially related to the technique realized by the present invention, among the sections of the POD site environment 103.

Figure 2:
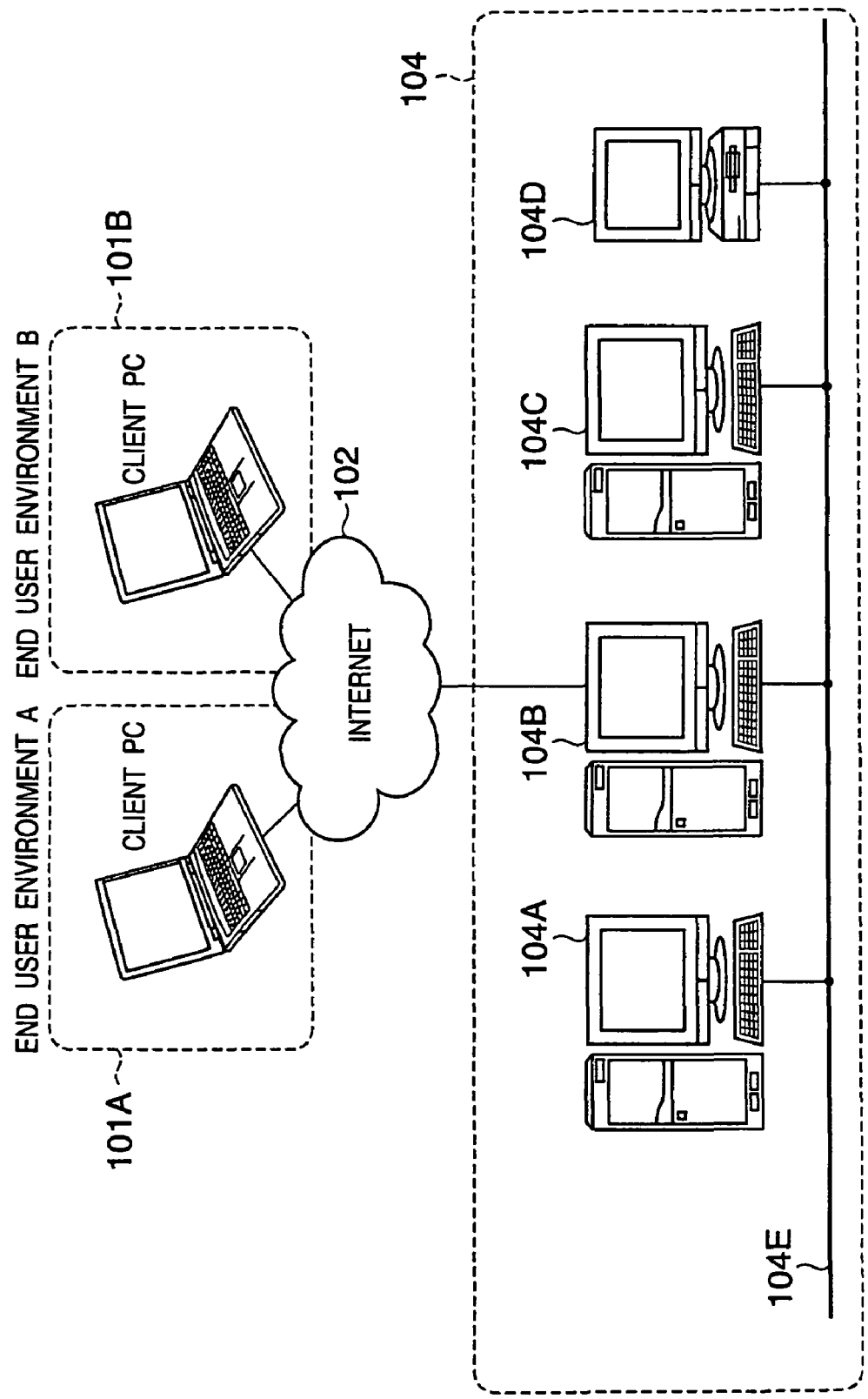
FIG. 2 is a block diagram showing an example of detailed configuration of a process management section 104 in a POD site environment 103 of the image processing system according to the embodiment of the present invention.

FIG. 2 is a block diagram showing an example of detailed configuration of the process management section 104 in the POD site environment 103 of the image processing system according to the embodiment of the present invention. One of the main functions of the process management section 104 is a function as a system referred to as a management information system (MIS) which is for collecting and analyzing information necessary for decision making for management of a company.

In general, MIS is a system which performs overall management of various management information and sales information such as information about advertisement, order receiving, estimate, planning, production, shipment, inventory, purchase and sales. Especially, MIS in the printing industry has an aspect as a print production process management system and performs centralized management of print production facilities and print production resources. Furthermore, the MIS in the printing industry can provide a mechanism for automating a total workflow from order receiving to delivery or cost recovery by means of a Job ticket referred to as a JDF (job definition format) on which a work instruction for a Job is described.

As shown in FIG. 2, in the process management section 104, an MIS server 104A, an order receiving server 104B, a file server 104C and a client PC 104D are connected to one another via a network 104E.

The MIS server 104A is a server computer to be the center in the management information system, and controls the workflow of this system configured by computers and various devices by issuing, based on specification of a Job by an end user, a JDF on which a work instruction for the job is described, to each process in the POD site environment 103.

This MIS server 104A also performs centralized management of the workflow of this system by exchanging messages referred to as JMF (job messaging format) with each process in the POD site environment 103 to acquire information about functions and capabilities provided for each device, status information about each device, progress information about an accepted job and the like.

Furthermore, the MIS server 104A has functions as a workflow editor, a workflow engine and a job scheduler and is capable of assembling works in each process as a workflow to instruct execution thereof and automating the workflow in each process by efficiently scheduling the work by each device and each worker.

A part of the functions described above may be realized by an application incorporated in a client PC to be used by a worker different from the worker of the MIS server 104A provided for the process management section 104.

The order receiving server 104B is an intermediator for electronic commerce (EC) in the POD site environment 103 and is a server for receiving a job from the client PC's of the end user environments 101A and 101B. That is, the order receiving server 104B is an electronic store utilizing a web page on the Internet 102 when seen from the end user environment 101A and the end user environment 101B.

For example, if a job to order is a print job, then, after performing user authentication from a browser of the client PC of the end user environment 101A or 101B, print conditions settings for specifying print conditions under which output should be performed and other print request information are inputted. Thereby, the client PC of the end user environment 101A or 101B can send a document/image file to be printed as electronic data together with the print conditions settings and other print request information to the order receiving server 104B via the Internet 102 and order a print job to the order receiving server 104B which functions as a web server.

In the image processing system described above, the order receiving server 104B or each of the client PC's of the end user environments 101A and 101B may be provided with a hot folder (not shown) to enable data transfer of a document/image file to be printed and accompanying print conditions settings and other print request information. The hot folder is a virtual folder which includes print conditions settings and print request information as attributes, and multiple such hot folders can be created in a memory (not shown) such as a hard disk provided for the order receiving server 104B or each of the client PC's of the end user environment 101A and 101B.

For example, from the client PC of the end user environment 101A or 101B, the end user drags and drops a document/image file to be printed to this hot folder. Then, the monitoring program of the order receiving server 104B or the client PC of the end user environment 101A or 101B recognizes the existence of the document/image file; print conditions settings and other print request information accompanying the hot folder are associated; and thereby, the receiving server can read the information.

In the case where a job to be ordered is a copy job, a paper document to be copied is sent as a physical medium by home delivery instead of sending a document/image file as electronic data, and only copy conditions settings for specifying copy conditions under which output should be performed and other copy request information are inputted from the browser of the client PC of the end user environment 101A or 101B. In this case, association of the paper document to be copied which has been separately sent with the copy conditions settings and other copy request information sent to the order receiving server 104B is determined by an operator.

The file server 104C is a server for storing a job (for example, a document/image file to be printed and accompanying print conditions settings and other print request information, or a scan image file obtained by scanning a paper document to be copied and accompanying copy conditions settings and other copy request information) received from an end user in preparation for re-order about the same document by the end user.

For example, an original document/image file of a print job received by the order receiving server 104B from the client PC of the end user environment 101A or 101B is stored in a memory unit (not shown) such as a hard disk provided for the file server 104C and held for a predetermined time period. Thereby, when a print job about the same document is re-ordered by the end user, the re-order can be easily processed without necessity of the end user sending the document/image file again.

Furthermore, by, after scanning a paper document of a copy job received from the end user and acquiring it as a scan image file, storing it in the memory unit (not shown) such as a hard disk provided for the file server 104C and holding it for a predetermined time period, it is possible, when a print job about the same document is re-ordered by the end user, to easily process the re-order without necessity of the end user sending the document/image file again.

Furthermore, after performing print processing of a print job or a copy job in an output form desired by the end user (for example, based on print conditions settings and other print request information, or copy conditions settings and other copy request information), by storing a final document/image file before printing which has been edited by workers or final print data for which print processing has been performed in the memory unit (not shown) such as a hard disk provided for the file server 104C and holding it for a predetermined time period, it is possible to reduce post-process works when a re-order is placed by the end user.

The MIS server 104A, the order receiving server 104B, the file server 104C and the client PC 104D in the process management section 104 as described above are connected to one another via the network 104E, and process a job received by the process management section 104 by transferring the job and issuing a control command.

Figure 3:
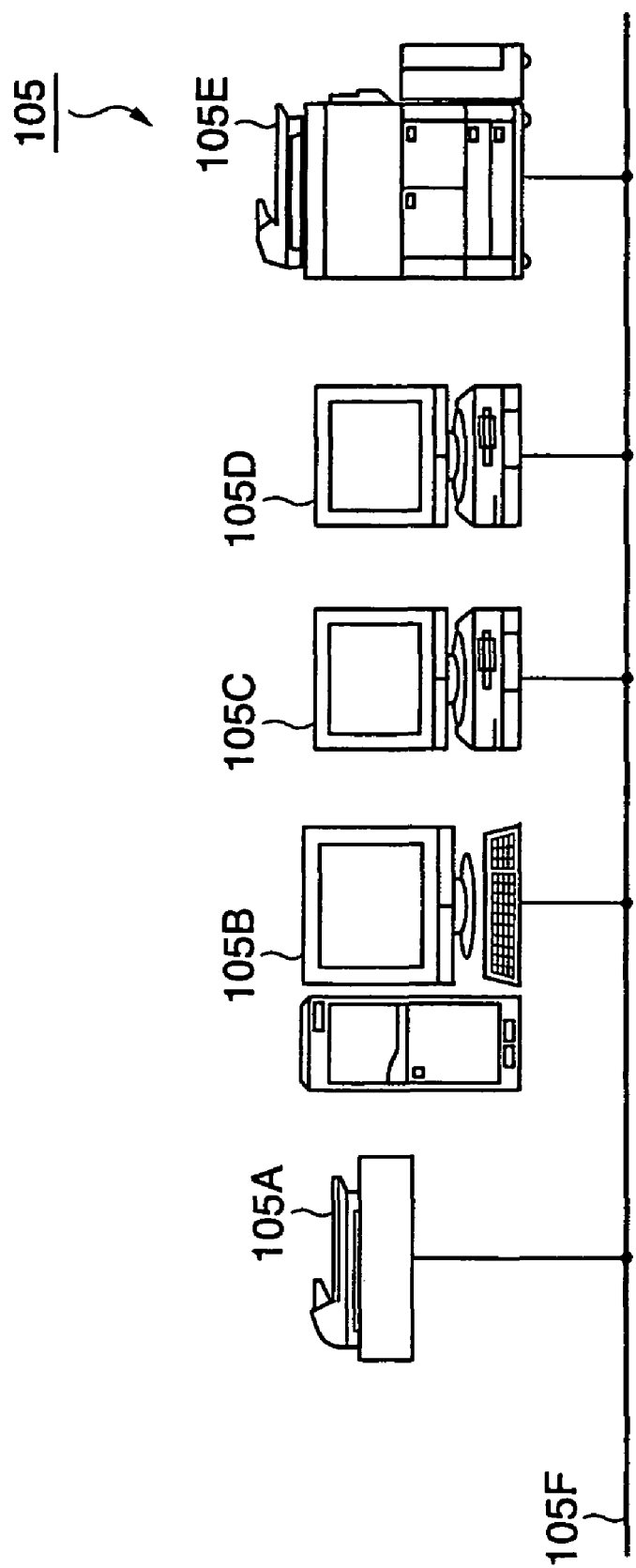
FIG. 3 is a block diagram showing an example of detailed configuration of a prepress section 105 in the POD site environment 103 of the image processing system according to the embodiment of the present invention.

FIG. 3 is a block diagram showing an example of detailed configuration of the prepress section 105 in the POD site environment 103 of the image processing system according to the embodiment of the present invention.

In the prepress section 105, a prepress server 105B is a server for scanning a paper document received from the end user by means of a scanning device such as a scanner 105A and an MFP 105E to acquire it as a scan image file. The prepress server 105B is also a server for performing image correction such as skew correction and black dot removal after acquiring an image, merging multiple document/image files received from the end user or multiple scan image files obtained by scan by means of a scanning device, performing insertion/deletion of a page and performing various page layout editing and imposition processings such as addition of a page number or an annotation, insertion of an index sheet, a front cover or a slip sheet, and specification of "N in 1" printing or double copy.

The prepress section 105 may be configured by one prepress server and multiple clients as shown in FIG. 3, or may be configured only by multiple client PC's without being provided with a prepress server.

In the case where a job received from the end user is a copy job, a worker first scans the paper document by means of a scanning device such as the scanner 105A and the MFP 105E and acquires a scan image file into the prepress server 105B or a client PC 105C or 105D. If the acquired scan image is inclined, the inclination of the scan image is corrected by performing skew correction. If there Is a punch hole or dust on the acquired scan image, the punch hole or dust can be removed by performing black dot removal processing.

In the prepress section 105, if a job received from the end user is a print job, a worker first acquires a document/image file received from the end user into the prepress server 105B or the client PC 105C or 105D.

If there are multiple document/image files received from the end user or multiple scan image files scanned by means of a scanning device, these files are merged.

Furthermore, in the prepress section 105, if it is necessary to further edit a document/image file received from the end user or a scan image file scanned by means of a scanning device, a worker inserts a page into the file to be edited from another file or deletes a page of the file to be edited while confirming the layout of multiple pages, for example. Furthermore, in the prepress section 105, it is also possible to perform various page layout editing or imposition processings such as addition of a page number or an annotation (a character or an image such as a watermark indicating that the document is confidential information and a logo), specification of "N in 1" printing or double copy (printing for laying out multiple pages on one printing surface), insertion of an index sheet, a front cover or a slip sheet, and specification of post-processing such as stapling, punching and Z fold.

In this prepress section 105, it is possible to construct a variable printing system for printing multiple copies of the same document while exchanging addresses and related data, in cooperation with a database constructed in the prepress server or a different server, in order to realize one-to-one marketing, such as printing of direct-mail addresses or printing of pamphlets according to respective customers.

In the printing industry, output called color comprehensive layout, which is intended for presentation to an advertiser, is generated before proceeding to a plate-making/printing process. Recently, a color hard copy obtained by outputting a digital color image processed by DTP for creating a printed matter with the use of a personal computer or by CEPS (color electronic prepress system) used for image correction and synthesis in a printing process, by means of a color printer or a Color plotter, such as a color MFP, is used as the color comprehensive layout described above.

In POD in which a printer such as an MFP is used, it is possible to perform proof output with the same color printer such as a color MFP (or a black-and-white printer such as a black-and-white MFP) for the purpose of layout confirmation corresponding to comprehensive layout, simplified color confirmation, detailed color confirmation corresponding to proof and the like.

In this prepress section 105, it is also possible to perform proof output to an MFP to check the layout and colors of the final product as necessary. As shown in FIG. 3, the prepress server 105B, the client PC's 105C and 105D, the scanner 105A and the MFP 105E in the prepress section 105 are connected to one another via a network 105F, and process a job received by the prepress section by transferring the job and issuing a control command.

Figure 4:
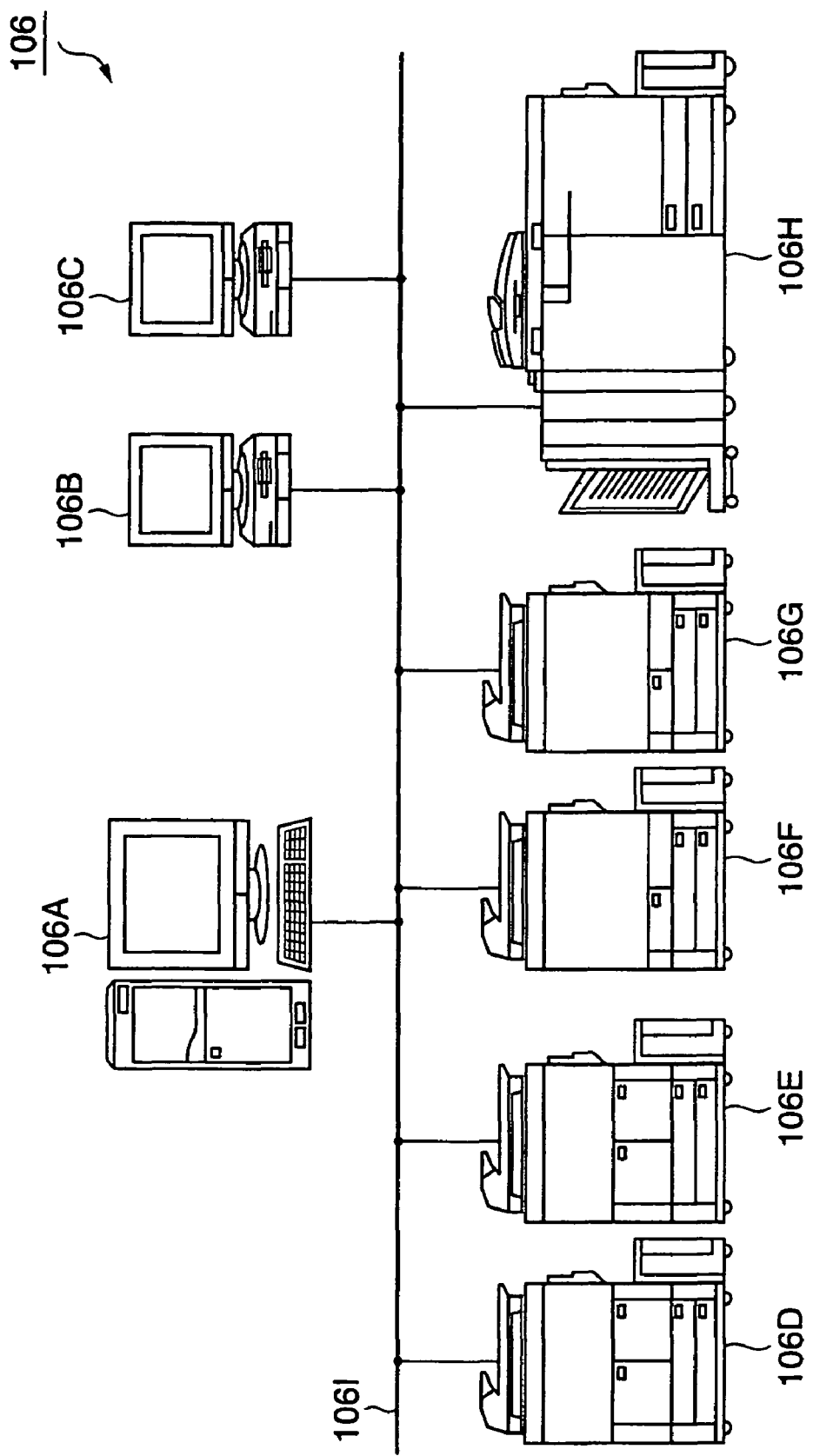
FIG. 4 is a block diagram showing an example of detailed configuration of a digital print section 106 in the POD site environment 103 of the image processing system according to the embodiment of the present invention.

FIG. 4 is a block diagram showing an example of detailed configuration of a digital print section 106 in the POD site environment 103 of the image processing system according to the embodiment of the present invention. As shown in FIG. 4, in the digital print section 106, there exist one or more print servers, client PC's, color MFP's and black-and-white MFP's connected to a network 106I.

In the digital print section 106, a print server 106A plays two roles. That is, one role is to send and receive information between the digital print section 106 and an external apparatus. The print server 106A plays a role of, if image information or settings information of a job to be received is inputted to the print server 106A, notifying information such as the status to the outside when the job ends. The other role is to perform management and control of the inside of the digital print section 106. That is, a job inputted from outside and a job generated inside the digital print section 106 are centralizedly managed by the print server 106A. Thereby, while the condition of all devices and all jobs existing inside the digital print section 106 can be monitored, pause, change in settings and resumption of printing of a job or control of copy, transfer, deletion and the like of a job can be performed.

In the digital print section 106, client PC's 106B and 106C have a role of instructing editing and printing of an inputted application file or throwing in a print-ready file and a role of assisting monitoring or control of the devices and the jobs managed within the print server.

Furthermore, in the digital print section 106, a color MFP's 106F and 106G and black-and-white MFP's 106D and 106E are image forming apparatuses having various functions such as scanning, printing and copying. Since a color MFP and a black-and-white MFP are different in the speed, the running cost and the like, it is necessary to appropriately use them according to purposes.

Figure 5:
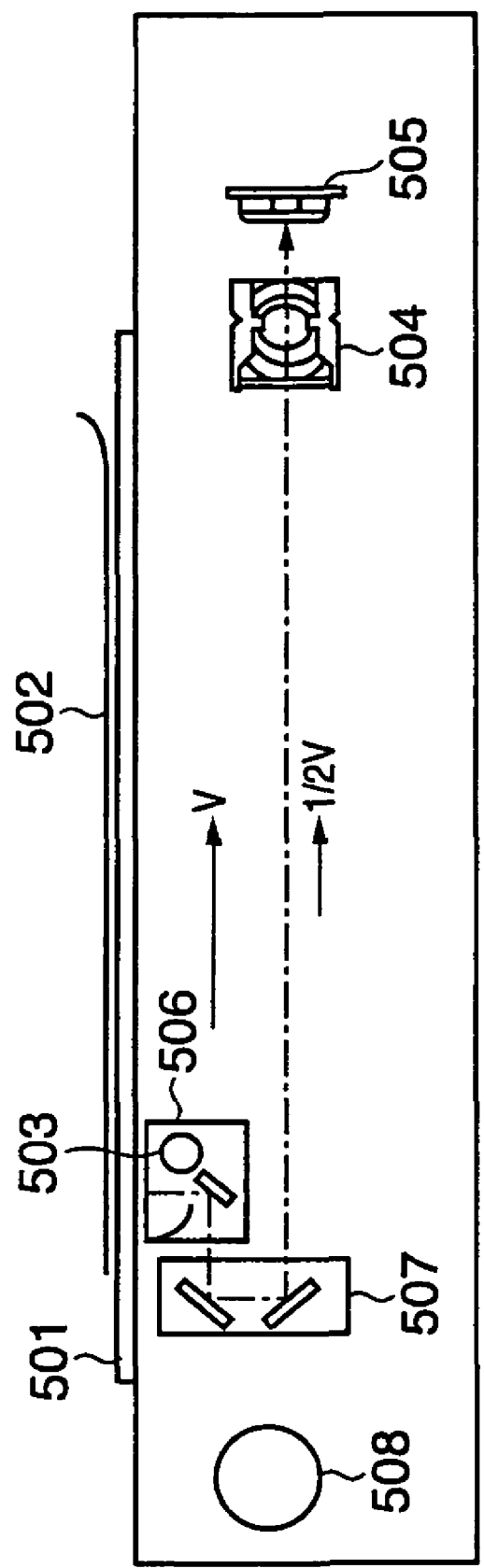
FIG. 5 is a sectional view showing an example of a scanner section provided for a scanner or an MFP in the POD site environment 103 of the image processing system according to the embodiment of the present invention.

FIG. 5 is a sectional view showing an example of a scanner section provided for a scanner or an MFP in the POD site environment 103 of the image processing system according to the embodiment of the present invention.

As shown in FIG. 5, a document sheet 502 to be read is placed on a document glass 501. The document sheet 502 is exposed to an illumination lamp 503 and its light is reflected by mirrors. Then, an image is formed on a CCD sensor 505 by a lens 504. A first mirror unit 506 including a mirror and the illumination lamp 503 moves at a speed of V, and a second mirror unit 507 provided with mirrors moves at a speed of V/2 to scan the entire surface of the document sheet 502. The first mirror unit 506 and the second mirror unit 507 are driven by a motor 508.

Figure 6:
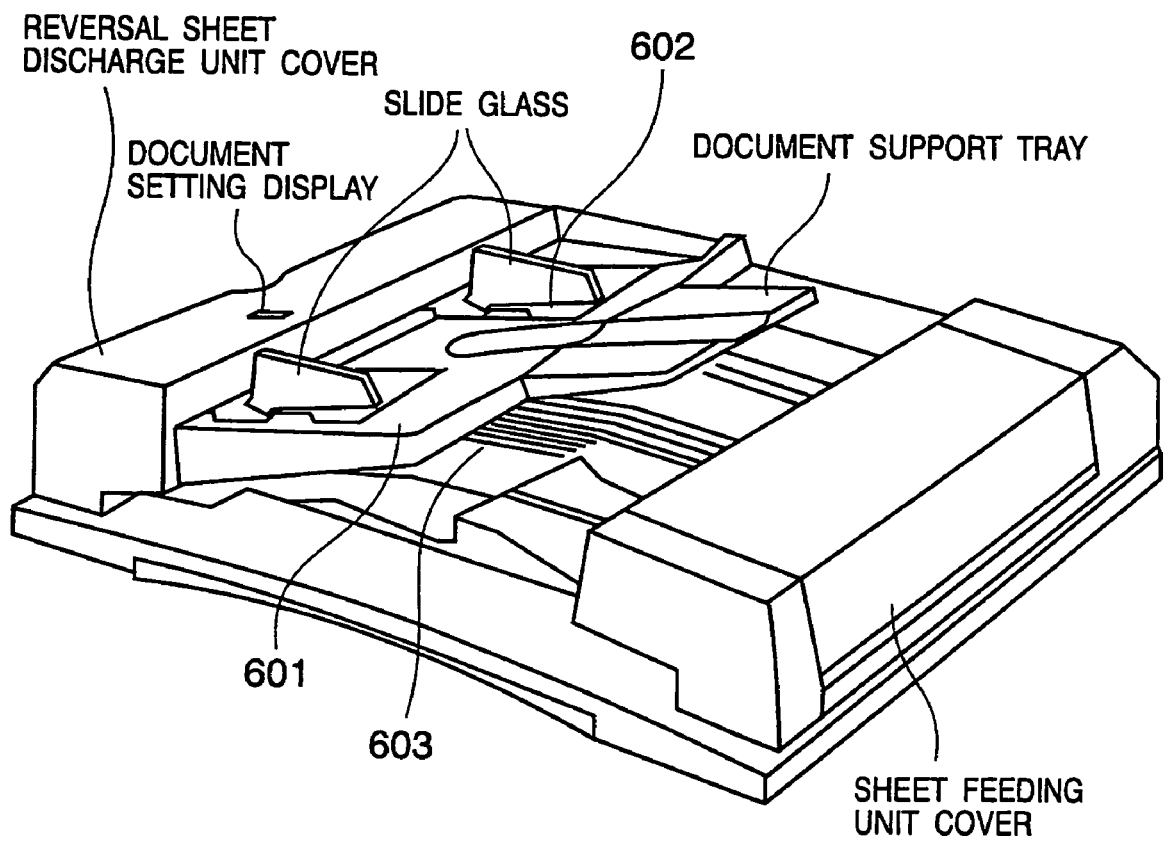
FIG. 6 is an external view of an automatic document feeder (ADF) provided for a scanner or an MFP in the POD site environment 103 of the image processing system according to the embodiment of the present invention.
Figure 7:
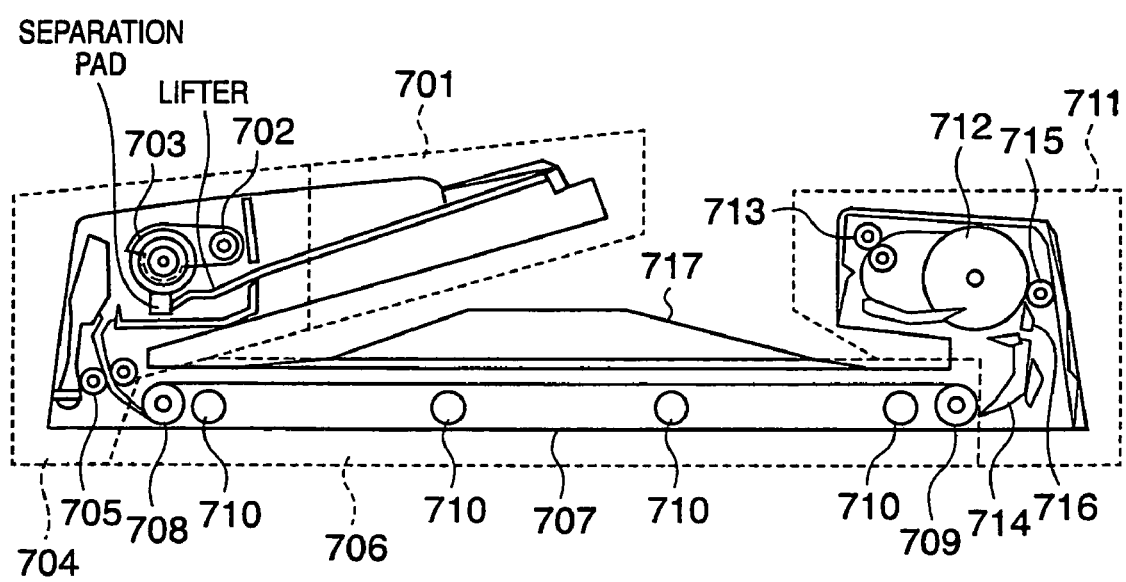
FIG. 7 is a sectional view of the automatic document feeder (ADF) provided for the scanner or the MFP in the POD site environment 103 of the image processing system according to the embodiment of the present invention.

FIG. 6 is an external view of an automatic document feeder (ADF) provided for a scanner or an MFP in the POD site environment 103 of the image processing system according to the embodiment of the present invention. FIG. 7 is a sectional view of the automatic document feeder (ADF) provided for the scanner or the MFP in the POD site environment 103 of the image processing system according to the embodiment of the present invention.

As shown in FIGS. 6 and 7, a document loading section 701 sets document sheets on a loading surface of a document tray 601. It is detected by a document detection sensor 602 that document sheets have been set on this portion. The document detection sensor 602 is arranged between a pickup roller 702 and a sheet feeding roller 703.

A document feeding section 704 separates a sheet at the top of a document bundle in a friction separation method and conveys the sheet to a resist roller 705. When a document sheet is fed, the pickup roller 702 is lowered to the top of the document bundle, and a intermediate plate is raised to press the document bundle to the sheet feeding roller 703 to start a sheet feeding preparation operation. Then, sheet feeding roller 703 and the pickup roller 702 are rotated in CW to convey the document sheet. The second and subsequent document sheets which are almost sent together with the sheet at the top are stopped by a scraper and they remain in the document loading section 701. It is detected by a separation sensor arranged downstream of the sheet feeding roller 703 that the document sheet has been separated.

After that, the document sheet passes between guide plates and is lead to a pair of resist rollers. When the tip of the document sheet reaches, the pair of resist rollers are still stopped. The document sheet forms a loop by being conveyed by the sheet feeding roller 703 so that skew correction is performed. Then, the document sheet is conveyed to a document conveyance section 706. In the document conveyance section 706, a conveyance belt 707 is stretched around a driving roller 708 and a driven roller 709, and the conveyance belt 707 is rotated by being pressed to a platen by holding rollers 710. Going between the conveyance belt 707 and the platen, the document sheet is conveyed over the platen by a frictional force of the conveyance belt 707.

When the document sheet which has advanced from the document feeding section 704 to the document conveyance section 706 is conveyed to a predetermined position on the platen by the conveyance belt 707, it stops in response to stop of a driving motor (not shown) and is read by a document reading section. Then, after being read, the document sheet is conveyed to the right direction in FIG. 7 and is led to a reversal sheet discharge section 711 by the driving motor being re-driven.

Here, if there is a subsequent document sheet, the subsequent document sheet is conveyed to the predetermined position by rotation of the conveyance belt 707, stops at the reading position in response to stop of the driving motor and is read by the document reading section, similarly to the previous document. While this reading operation is performed, the operation of reversing the front and back sides of the previous document by the reversal sheet discharge section 711, which separately operates, and conveying it to a discharged document loading section 717 is continuously performed.

Here, reversal sheet discharge operation by the reversal sheet discharge section 711 will be described. The reversal sheet discharge section 711 is provided with a reversal roller 712, a pair of conveyance rollers 713 and a motor not shown as a driving source of the rollers. This motor is configured to be capable of normal rotation and reversal rotation. The reversal sheet discharge section 711 is configured to be able to be driven separately from the document conveyance section 706 which is driven by a separate motor.

Next, document sheet discharge operation by the reversal sheet discharge section 711 will be described. When a document sheet is carried into the reversal sheet discharge section 711 by the conveyance belt, a reversal flapper 714, which controls the travel route of paper near the entrance thereof, takes a position as shown in FIG. 7 under the control of a solenoid not shown, and the document sheet is introduced into the reversal roller 712. Then, the document is caught between the reversal roller 712 rotating in CCW and a reversal roller 715 positioned against the reversal roller 712 and conveyed to the pair of conveyance rollers 713.

Then, when the rear end of the document reaches a position where a sheet discharge flapper 716 ends, the sheet discharge flapper 716 rotates in CW, and the reversal roller 712 reversely rotates in CW to start switchback conveyance of the document sheet. In this way, the document sheet is introduced into the lower left portion of the reversal roller 712 in FIG. 7 and discharged to a document discharge tray 603 of the document the discharged document loading section 717.

Next, the outline of a document processing system, an embodiment of the present invention, will be described with reference to FIG. 27. In this document processing system, a data file created by a general application is converted to an electronic document file by an electronic document writer (which may also be referred to as a driver for storage of print data). An image read by a scanner is also converted to an electronic document file by some means such as a scanner driver and other application software. A bookbinding application (which may also be referred to as a print control application) provides a function of editing such an electronic document file. Though the general applications, the scanner driver, the electronic document writer, the bookbinding application and an electronic document despooler (which may also be referred to as a print application) are separately shown in order to clarify each function in this example, a package to be provided for a user is not limited thereto and may be provided as an application configured by combination of them or a graphic engine. Details of the document processing system will be described below.

< An Example of Software Configuration of a Document Processing System of this Embodiment>

Figure 27:
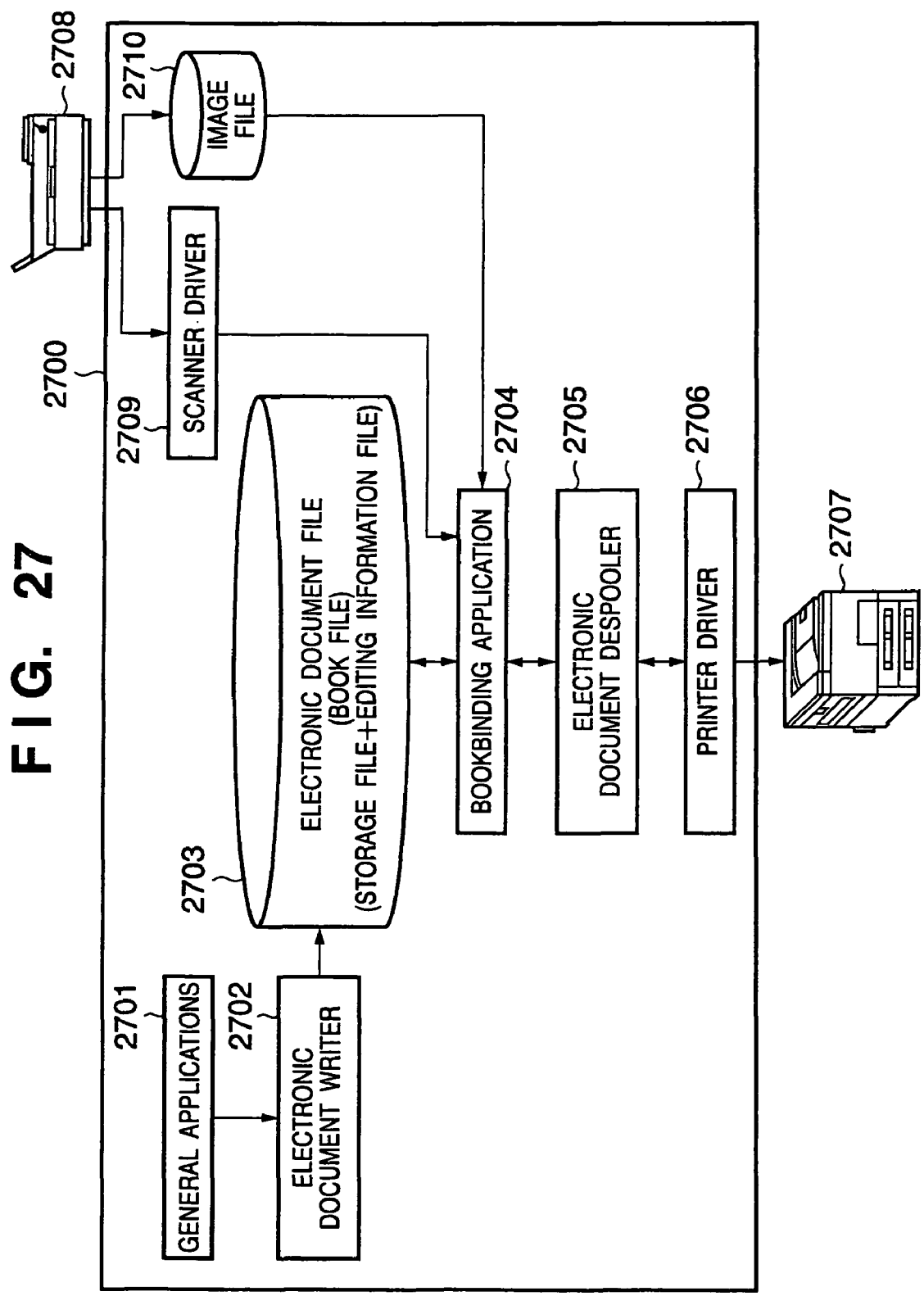
FIG. 27 is a block diagram showing software configuration of a document processing system according to an embodiment of the present invention.

FIG. 27 is a block diagram showing software configuration of a document processing system according to an embodiment of the present invention.

The document processing system is realized by a digital computer 2700 (which may also be hereinafter referred to as "a host computer"), a preferred embodiment of a document processing apparatus (an information processing apparatus) of the present invention. General applications 2701 are application programs which provide functions such as word processing, spread sheet processing, photo retouching, drawing or painting, presentation, text editing, and the like, and they have a printing function for an OS. When printing created application data such as document data and image data, these applications utilize a predetermined interface (generally referred to as GDI) provided by an operating system (OS).

That is, the general applications 2701 send a predetermined output command (referred to as a GDI function) in an OS-dependent format to an output module of the OS which provides the interface to print the created data. Receiving the output command, the output module converts the command to a command in a format which can be processed by an output device such as a printer and outputs the converted command (referred to as a DDI function). Since the format which can be processed by an output device differs according to the kind, manufacturer or model of the device, a device driver is provided for each device. The OS uses the device driver to convert the command, generates print data, and surrounds it with JL (Job Language) to generate a print job. When Windows® by Microsoft Corporation is used as the OS, a module called GDI (graphic device interface) corresponds to the output module-described above.

An electronic document writer 2702 is an improvement of the device driver described above, and it is a software module provided to realize the present document processing system. However, the electronic document writer 2702 does not target a particular output device, and converts the output command to a command in a format which can be processed by a bookbinding application 2704 and a printer driver 2706 to be described later. The format (hereinafter referred to as "an electronic document format") after the conversion by the electronic document writer 2702 may be any format only if document pages can be expressed in a detailed form. Among practical standard formats, the PDF format and the SVG format by Adobe Systems Corporation, for example, can be adopted as the electronic document format.

When the electronic document writer 2702 is utilized by the general applications 2701, the electronic document writer 2702 is specified as a device driver to be used for output before execution of printing. However, an electronic document file just created by the electronic document writer 2702 is not in a complete format as an electronic document file. Therefore, it is the bookbinding application 2704 that specifies the electronic document writer 2702 as a device driver, and conversion from application data to an electronic document file is performed under the control of the bookbinding application 2704. The bookbinding application 2704 completes the new, incomplete electronic document file generated by the electronic document writer 2702 as an electronic document file having a format to be described later. Hereinafter, when it is necessary to clearly identify this point, a file created by the electronic document writer 2702 is called an electronic document file, and an electronic document file which has been given a structure by the bookbinding application 2704 is called a book file. When it is not necessary to especially distinguish them from each other, any of a document file generated by an application, the electronic document file and the book file are called a document file (or document data).

In this way, by specifying the electronic document writer 2702 as a device driver and causing the general application 2701 to print its data, the application data is converted into an electronic document format in which a page defined by the application 2701 (hereinafter referred to "a logical page" or "a document page") is a unit, and stored in a storage medium such as a hard disk as electronic document files 2703. The hard disk may be a local drive provided for a computer which realizes the document processing system of this embodiment or a drive provided on a network if it is connected to the network.

The bookbinding application 2704 provides a user with a function of reading an electronic document file or a book file 2703 and editing it. However, the bookbinding application 2704 does not provide a function of editing the content of each page but provides a function of editing the structure of a chapter or a book configured with a page as a minimum unit, which will be described later.

In this embodiment, first, print data from the general applications 2701 is stored on the system as electronic document files 2703 via the electronic document writer 2702. The electronic document files 2703 includes an intermediate file and an editing information file. The intermediate file includes content data, settings data for printing and the like of a printed matter. The content data of a printed matter is data obtained by converting data created by a user on an application to an intermediate code. The settings data for printing is data in which description about how the content data should be outputted (such as about an output form) is provided. In addition, there is also included extended data for an application, which is referred to an editing information file, for providing a user interface to be used when the bookbinding application 2704 causes the user to instruct editing or output of the content of the electronic document files 2703. In the editing information file, there is stored not only the extended data for providing the user interface but also the settings data for printing which cannot be stored in the intermediate file. Therefore, even if a standardized format, for example, is used as the intermediate file, settings for printing, which cannot be stored in the format, can be stored in this editing information file.

The electronic document files 2703 are read by the bookbinding application 2704. The bookbinding application 2704 develops the content of the intermediate file as a table on a memory. Furthermore, if specific settings which are not included in the intermediate file are included in the editing information file, then the bookbinding application 2704 reflects the settings on the table developed on the memory. The output form of the content of the read intermediate file can be changed, displayed, stored and printed. It is an electronic document despooler 2705 that actually performs processing for printing.

When a book file 2703 edited by the bookbinding application 2704 is printed, the electronic document despooler 2705 is activated by the bookbinding application 2704. The electronic document despooler 2705 is a program module to be installed in the computer together with the bookbinding application 2704. It is a module to be used to output rendering data to the printer driver 2706 when a document (a book file) to be used by the bookbinding application 2704 is printed. In order to read the specified book file (electronic document file) 2703 from a hard disk and print each page in a format described in the book file (electronic document file) 2703, that is, a format defined by the intermediate file and the editing information file, the electronic document despooler 2705 generates the above-described output command appropriate for the output module (graphic engine) of the OS and outputs it to the output module not shown. In this case, the printer driver 2706 of a printer 2707 to be used as an output device is specified as a device driver. The output module converts the received output command to a device command which can be interpreted and executed by the printer 2707, with the use of the specified printer driver 2706 of the printer 2707. Then, the device command is sent to the printer 2707, and an image corresponding to the command is printed by the printer 2707.

Furthermore, the system shown in FIG. 27 is provided with a scanner and is capable of reading an image by means of the scanner 2708 and stores it as the electronic document files 2703. There are mainly two methods for acquiring an image from the scanner 2708. One is a method called pull scan, in which scan is instructed from an application which receives the image. Specifically, a method is given as an example in which the application acquires image data via a scanner driver 2709. As the scanner driver, a driver appropriate for TWAIN or ISIS is generally used. The resolution, the number of colors and the like can be set on the scanner driver.

The other is a method called push scan, in which scan is instructed from the scanner side. Specifically, a method is given as an example, in which the scanner stores an image file in a hard disk shared via a network. In this case, the scanner is required to be provided with a network function common to the digital computer 2700 and authorized to write to a shared folder.

In the case of the push scan, the quality setting of an image file is made on a panel or the like of the scanner body. The image format used in general is TIFF, JPEG, BMP, PDF or the like. In the case of the pull scan, the bookbinding application 2704 acquires and reads image data directly from a scanner driver. In the case of the push scan, an image file placed, for example, in a predetermined folder of the digital computer 2700 is read. In this case, the bookbinding 1 application 2704 may monitor the folder in which the scanned image file is placed or receive a scan end notification from the scanner to automatically read the image file without waiting for a user input. Alternatively, the user may give an instruction to read the image file placed in the digital computer 2700 into the bookbinding application 2704.

In this way, the bookbinding application (document editing application) 2704 can receive image data read from the scanner.

<Format Example of Electronic Document Data>

Before referring to details of the bookbinding application 2704, the data format of a book file will be described. A book file has a hierarchical structure with three layers which emulates a book which is a paper medium. The top layer is referred to as "a book", which emulates one book and for which attributes of the whole book are defined. An intermediate layer below the top layer corresponds to a chapter of a book and is also called "a chapter". Attributes for each chapter can be defined. The bottom layer is "a page", which corresponds to each page defined by an application program. Attributes for each page can be also defined. One book may include multiple chapters, and one chapter can include multiple pages.

Figure 28:
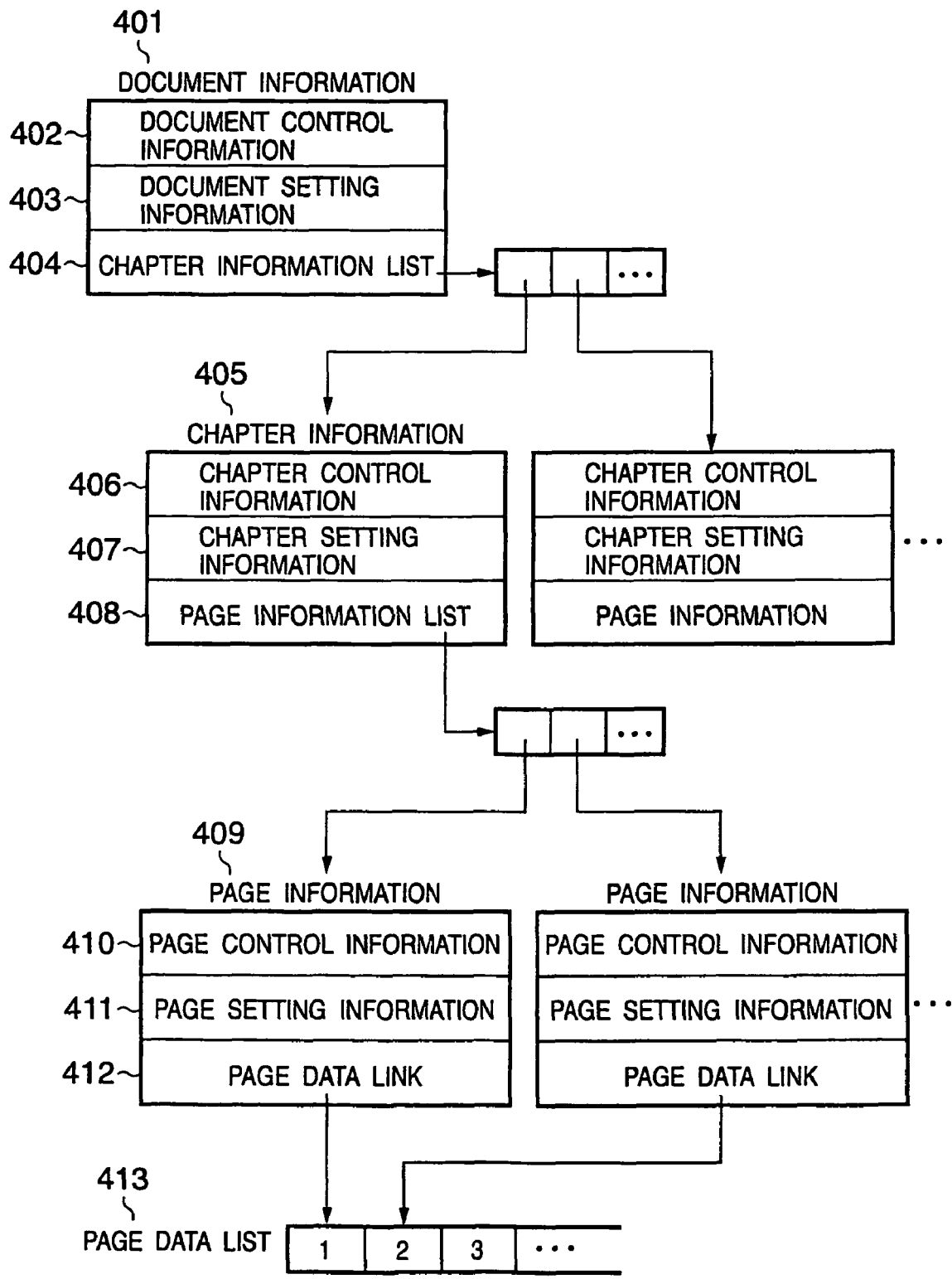
FIG. 28 schematically shows an example of a book file format.

FIG. 28 schematically shows an example of a book file format. This book file format is shown based on the editing information file. That is, FIG. 28 shows the structure of the editing information file among the electronic document files. A book, a chapter and a page in a book file is shown by a node corresponding to each of them. One book file includes one book. Since a book and a chapter are concepts for defining a structure as a book, defined attribute values and links to a lower layer are included as the substance. A page has data for each page outputted by an application program as the substance. Therefore, a page has the substance of a document page (document page data) and links to respective document page data in addition to its attribute values. A print page to be outputted to a page medium or the like may include multiple document pages. This structure is not shown by links but shown as attributes of each layer of book, chapter and page.

In FIG. 28, since a book file is not required to be one completed book, "a book" is generalized and shown as "a document".

At the top layer, there is provided document information 401. The document information 401 is mainly classified into three parts 402 to 404. In the document control information 402, there is held information such as path names in a file system of a document file. The document settings information 403, in which layout information such as page layout and function settings information about a printing apparatus such as stapling are held, corresponds to attributes of a book. In the chapter information list 404, a set of chapters constituting a document is held in a list form. It is chapter information 405 that is held in the list.

The chapter information 405 is also mainly classified into three parts 406 to 408. In the chapter control information 406, information such as a name of a chapter is held. The chapter settings information 407, in which page layout specific to the chapter and stapling information are held, corresponds to chapter attributes. By providing settings information for each chapter, it is possible to create a document with complicated layouts, for example, a document with the first chapter in the 2up layout and the other chapters in the 4up layout. In the page information list 408, a set of document pages constituting each chapter is held in a list form. It is page information data 409 that is specified by the page information list 408.

The page information data 409 is also mainly classified into three parts 410 to 412. In the page control information 410, information such as a page number to be displayed as a tree is held. The page settings information 411, in which information such as a page turning angle and page arrangement position information is held, corresponds to document page attributes. The page link information 412 is document data corresponding to the page. In the example in FIG. 28, the page information data 409 does not directly have document data but has only the page link information 412, and the actual document data is held by a page data list 413.

FIGS. 29A and 29B are lists showing examples of book attributes (the document setting information 403). Usually, as for items which can be defined redundantly with a lower layer, attribute values of the lower layer are preferentially adopted. Therefore, as for items included only in book attributes, values defined as the book attributes are effective through the entire book. However, as for the items overlapping with those of a lower layer, the values are meant to be specified values effective only when values are not defined in the lower layer. However, in this embodiment, it is possible to select whether or not to give priority to the attribute values of a lower layer. Each item shown in the figure does not specifically correspond to one item but may include some related items.

Items specific to the book attributes are the following five items: book binding details, front cover/back cover, index sheet, slip sheet and chapter separator. These are items defined through an entire book. As printing method attributes, any of the following three values can be specified: single-sided printing, double-sided printing and bookbinding printing. The bookbinding printing is a method for performing printing in a format enabling bookbinding by folding a bundle of a separately specified number of sheets in folio and binding the bundle. As the bookbinding details attributes, the direction of two-page spread, the number of sheets to be bundled and the like can be specified when the bookbinding printing is specified.

The front cover/back cover attributes include specification of addition of sheets to be a front cover and a back cover when electronic document files to be integrated as a book is printed, and specification of content to be printed on the added sheets. The index sheet attributes include specification of insertion of an index sheet with a tab separately prepared in a printing apparatus as a chapter separator, and specification of content to be printed on the index tab portion. This attribute is effective when the printing apparatus to be used is provided with an inserter having an insertion function of inserting a sheet prepared separately from printing sheets into a desired position or when multiple sheet feeding cassettes can be used. The same goes for the slip sheet attributes.

The slip sheet attributes include specification of insertion of a sheet provided from an inserter or a sheet feeding cassette as a chapter separator, and specification of a sheet feeding source if a slip sheet is to be inserted.

The chapter separator attributes include specification of whether a new sheet should be used, a new print page should be used or nothing should be especially done at a separation position between chapters. In the case of the single-sided printing, use of a new sheet and use of a new print page have the same meaning. In the case of the double-sided printing, consecutive chapters are not printed on one sheet if "use of a new sheet" is specified, but consecutive chapters may be printed on the front and back sides of one sheet if "use of a new print page" is specified.

FIG. 30 is a list showing an example of chapter attributes (the chapter setting information 407). The relation between the chapter attributes and the page attributes are similar to the relation between the book attributes and attributes of a lower layer.

As for the chapter attributes, there are not items specific to a chapter, and all the items overlap with book attributes. Therefore, if definition of an item is different in the chapter attributes and in the book attributes, then a value defined in the chapter attributes is usually given priority. However, in this embodiment, it is possible to select whether or not to give priority to the attribute values of a lower layer, as described later.

Items which are only common to the book attributes and the chapter attributes are the following six items: printing method, sheet size, sheet direction, specification of N-up printing, enlargement/reduction, and sheet discharge method. As the printing method attribute, any of the following three values can be specified: single-sided printing, double-sided printing and bookbinding printing as a book attribute. However, as a chapter attribute, it is possible to specify whether or not to perform the single-sided printing, that is, specify any of the single-sided printing and the double-sided printing only when the double-sided printing is specified, and it is possible to set switching of the single-sided printing and the double-sided printing within one book. The N-up printing specification attribute is an item for specifying the number of document pages to be included in one print page. The specifiable arrangements include 1×1, 1×2, 2×2, 3×3, 4×4 and the like. The sheet discharge method attribute is an item for specifying whether or not to perform stapling processing for discharged sheets, and the effectiveness of this attribute depends on whether or not the printing apparatus to be used has a stapling function.

Attributes common to the book, the chapters and the pages include a watermark attribute and a header/footer attribute. A watermark is an image, a character string or the like which is separately specified and which is to be overlappedly printed on data created by an application. A header and a footer are watermarks to be printed on the upper margin and the lower margin of each page, respectively. As for the header and the footer, however, items which can be specified by variables are prepared, such as a page number, and time and a date. The content which can be specified for the watermark attribute and the header/footer attribute is common to chapters and pages. However, the content for the book is different therefrom. As for the book, the content of a watermark or a header/footer can be set, and it is also possible to specify how the watermark or the header/footer should be printed through the book. On the other hand, as for the chapters or the pages, it is possible to specify whether or not the watermark or the header/footer set for the book should be printed in the chapters or the pages.

Next, description will be made on an example of a setting screen of a document editing application 2704 (corresponding to the bookbinding application 2704 described above) according to an embodiment of the present invention. FIGS. 8 to 11 show an example of screen configuration of the document editing application to be used for performing various page layout editing and imposition processings.

Figure 8:
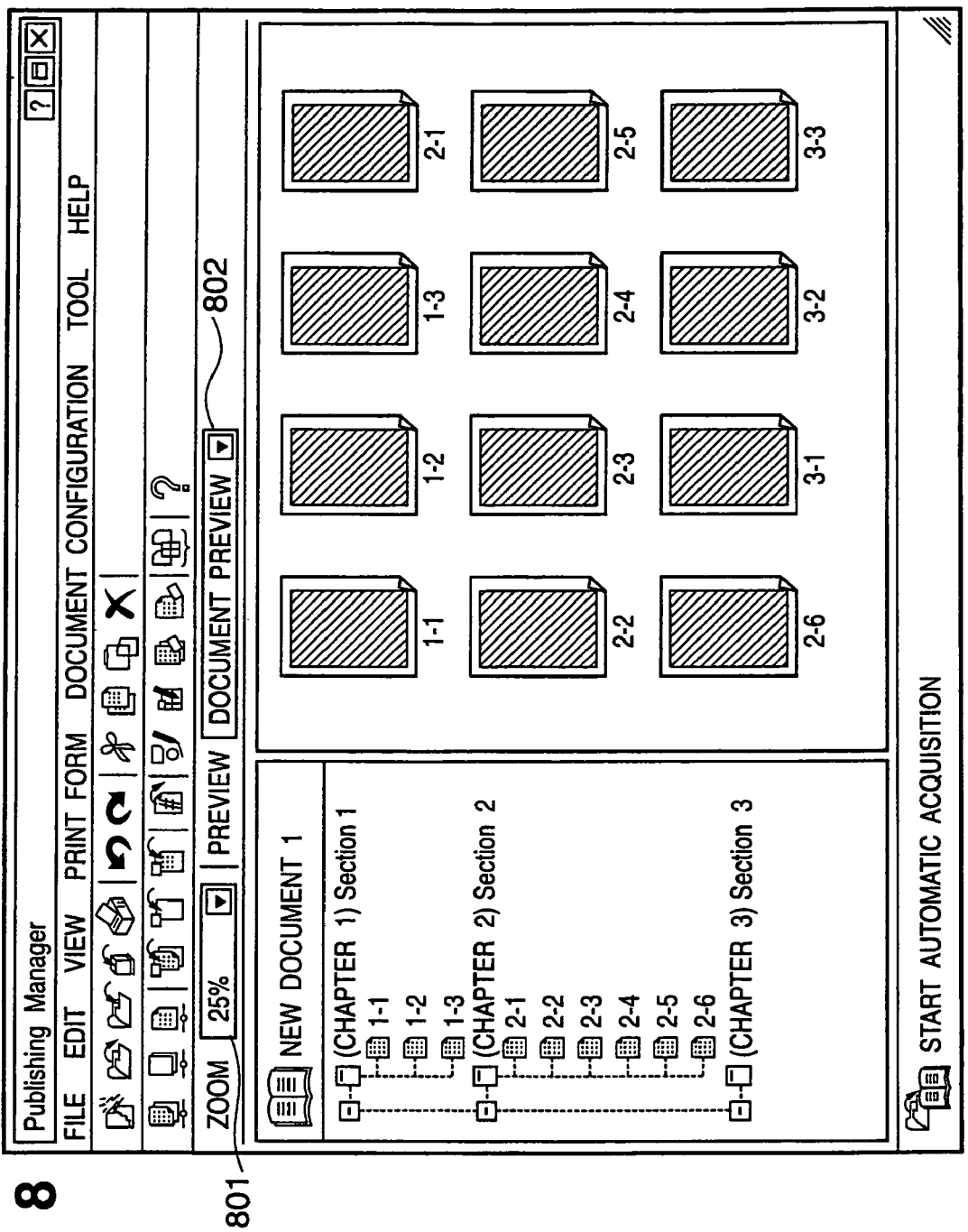
FIG. 8 shows a document sheet preview screen when, after imposition processing with "2 in 1" configuration for printing two pages on one sheet is performed, saddle stitch binding is specified as a post-processing process in which staple processing and folding processing are performed for the center portion of the sheet.
Figure 9:
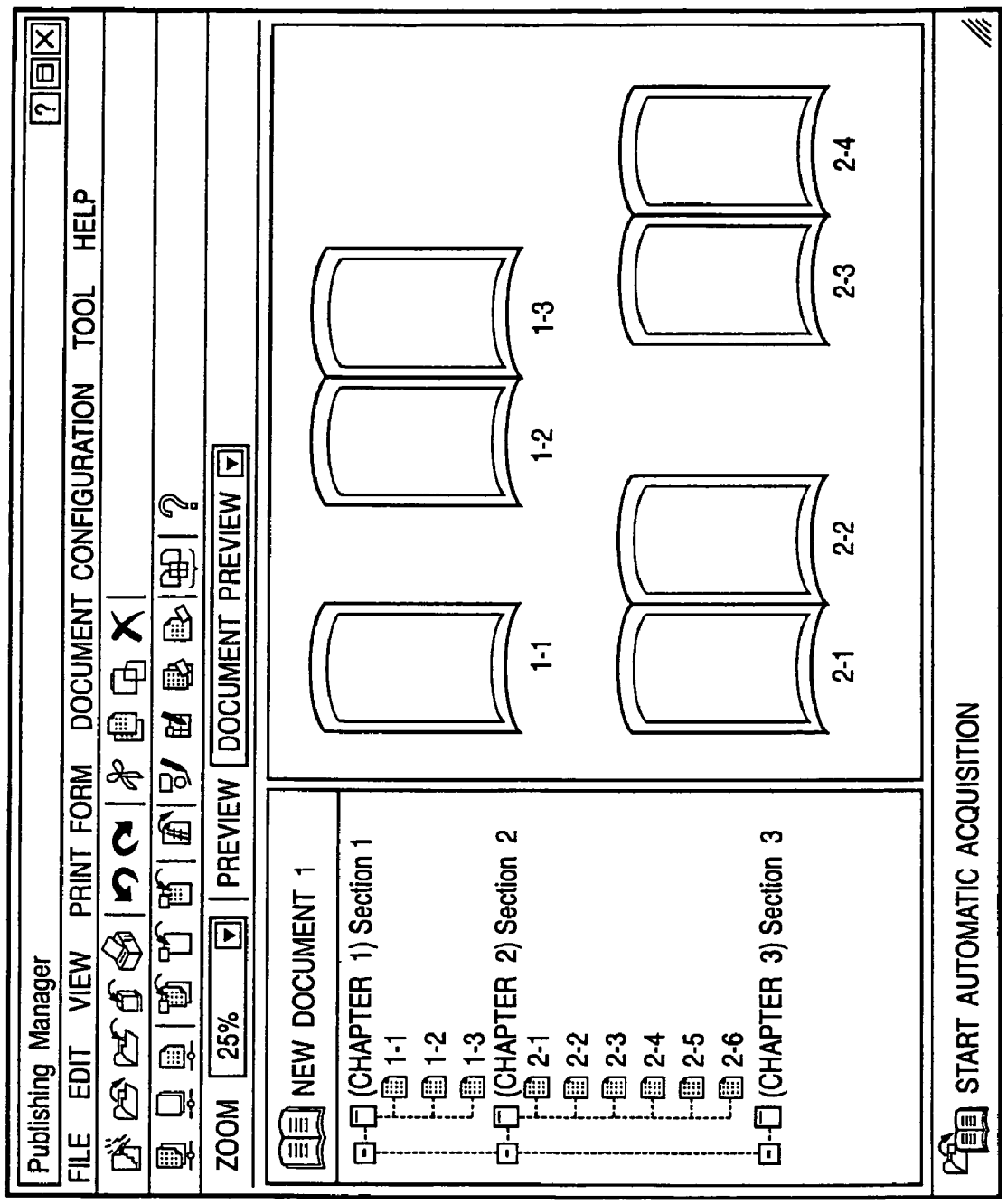
FIG. 9 shows a print preview screen when the saddle stitch binding is specified.
Figure 10:
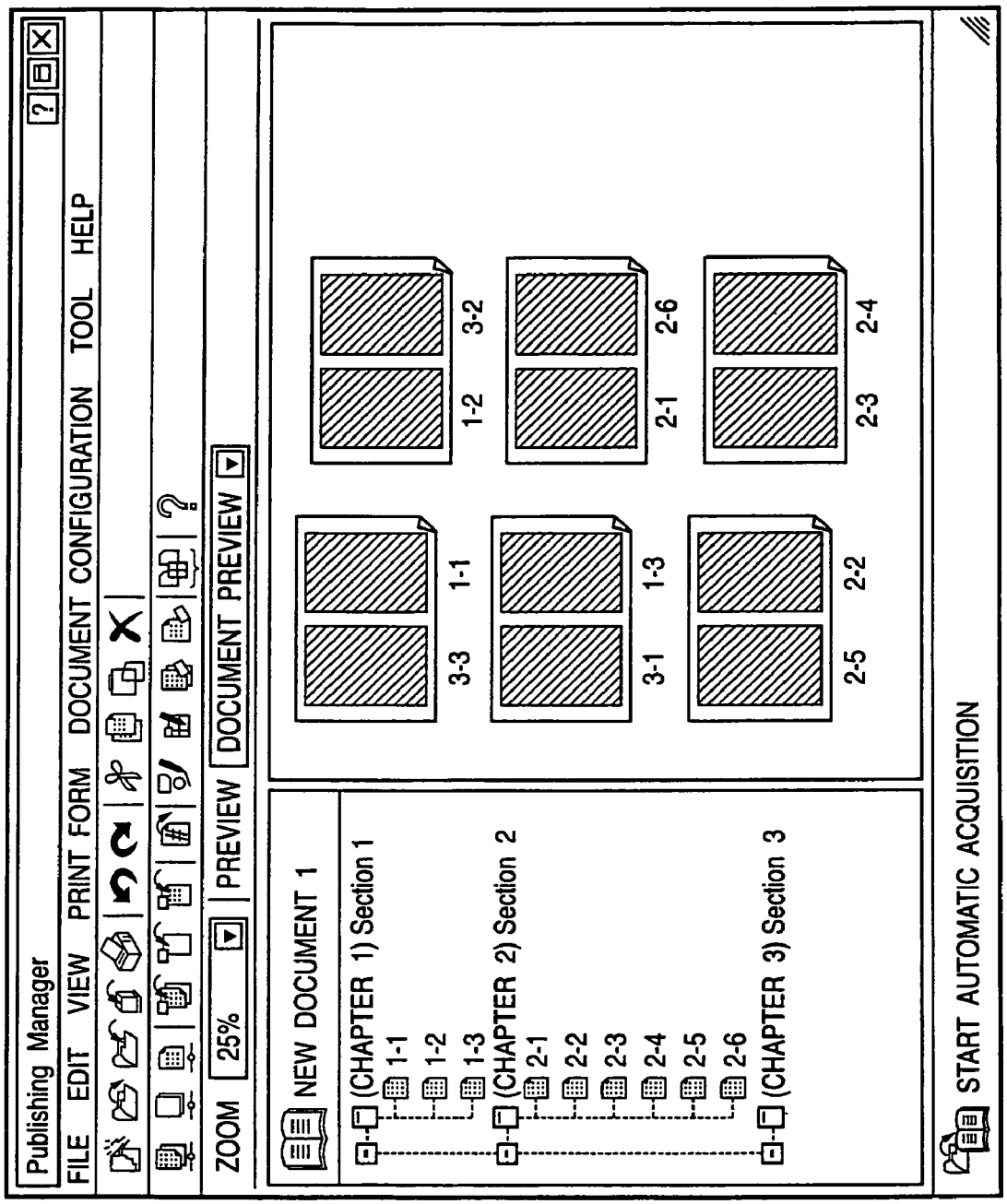
FIG. 10 shows a sheet preview screen when the saddle stitch binding is specified.
Figure 11:
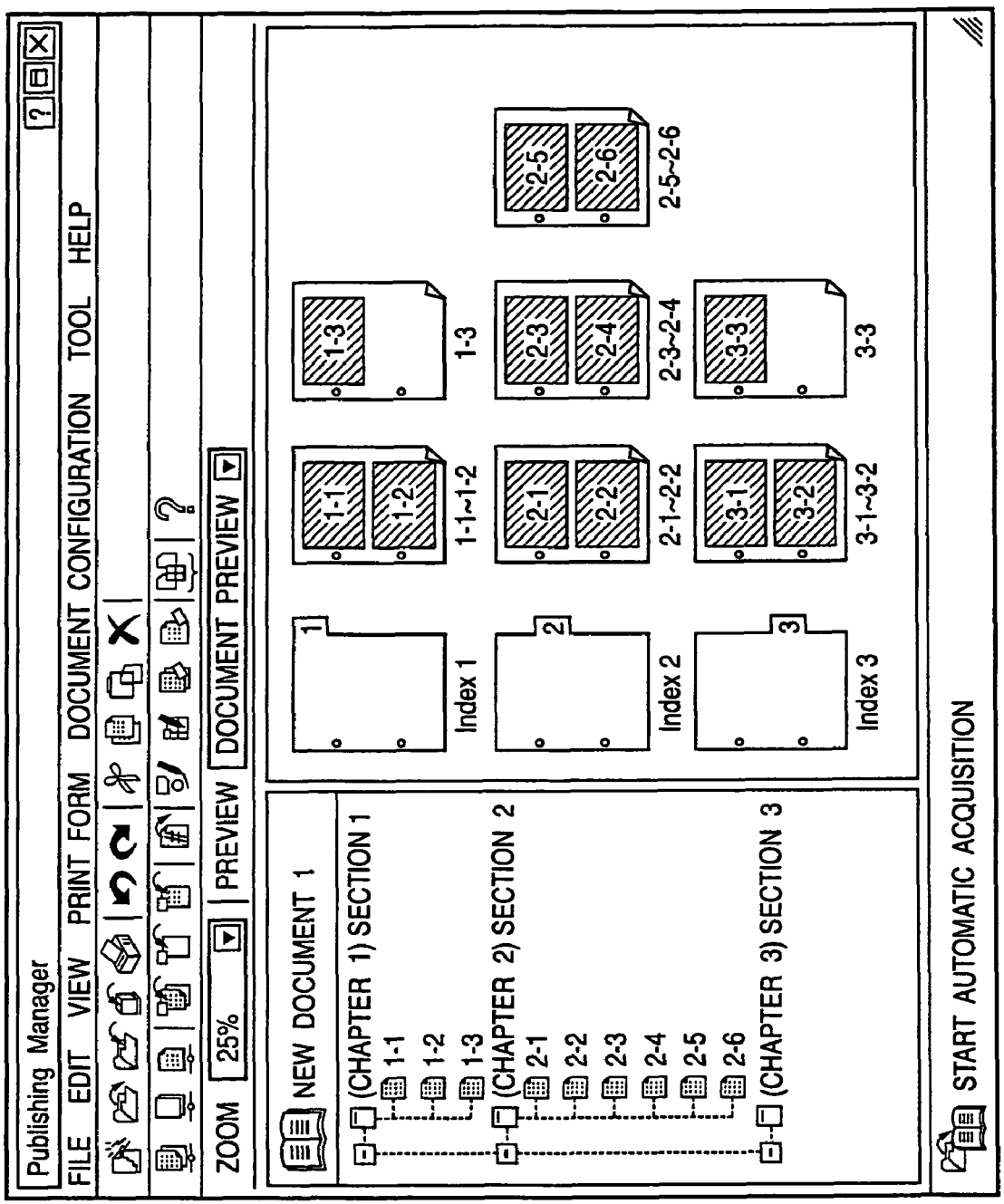
FIG. 11 shows a print preview screen when an index sheet is inserted at the beginning of a chapter in the case of the "2 in 1" configuration for printing two pages on one sheet.

For example, FIG. 8 shows a document sheet preview screen when, after imposition processing with "2 in 1" configuration for printing two pages on one sheet is performed, saddle stitch binding is specified as a post-processing process in which staple processing and folding processing are performed for the center portion of the sheet. FIG. 9 shows a print preview screen when the saddle stitch binding is specified. Furthermore, FIG. 10 shows a paper preview screen when the saddle stitch binding is specified. Furthermore, FIG. 11 shows a print preview screen when an index sheet is inserted at the beginning of a chapter in the case of the "2 in 1" configuration for printing two pages on one sheet.

At the upper side of each setting screen of the document editing application shown in FIGS. 8 to 11, a menu including "file", "edit", "view", "print form", "document configuration" "tool" and "help" and tool bar icons are arranged so that various processings of the document editing application may be performed. In the left frame of each setting screen of the document editing application shown in FIGS. 8 to 11, configuration of chapters of a targeted document is displayed. Furthermore, in the right frame of each setting screen of the document editing application, a preview image of the targeted document is displayed.

For example, with a "zoom" pull-down list box 801, the display magnification of preview display in the right frame can be switched. With a "previews pull-down list box 802, the preview display mode can be switched among "document preview", "print preview" and sheet preview".

If the "document preview" is selected from the pull-down list box 801, preview images are displayed in the page order in accordance with the order of the original document images, for example, in the order of page 1-1, page 1-2, page 1-3, page 2-1, page 2-2, . . . , page 3-1, page 3-2 and page 3-3 as shown in the setting screen of the document editing application in FIG. 8.

If the "print preview" is selected with the pull-down list box 801, preview images are displayed in the page order in accordance with the order of the print images in the form of final bookbinding, for example, in the order of page 1-1 (front cover), page 1-2 (left), page 1-3 (right), page 2-1 (left), page 2-2 (right), . . . , page 3-1 (left), page 3-2 (right) and page 3-3 (back cover) as shown in the setting screen of the document editing application in FIG. 9.

Furthermore, if the "sheet preview" is selected with the pull-down list box 801, preview images are displayed in the page order in accordance with the order of the output sheet images, for example, in the order of page 3-3 (front side, left), page 1-1 (front side, right), page 1-2 (back side, left), page 3-2 (back side, right), page 2-5 (front side, left), page 2-2 (front side, right), page 2-3 (back side, left) and page 2-4 (back side, right) as shown in the setting screen of the document editing application in FIG. 10.

When printing is performed with a printer such as an MFP from this document editing application finally, "print" is selected from the "file" menu to perform printing.

Figure 12:
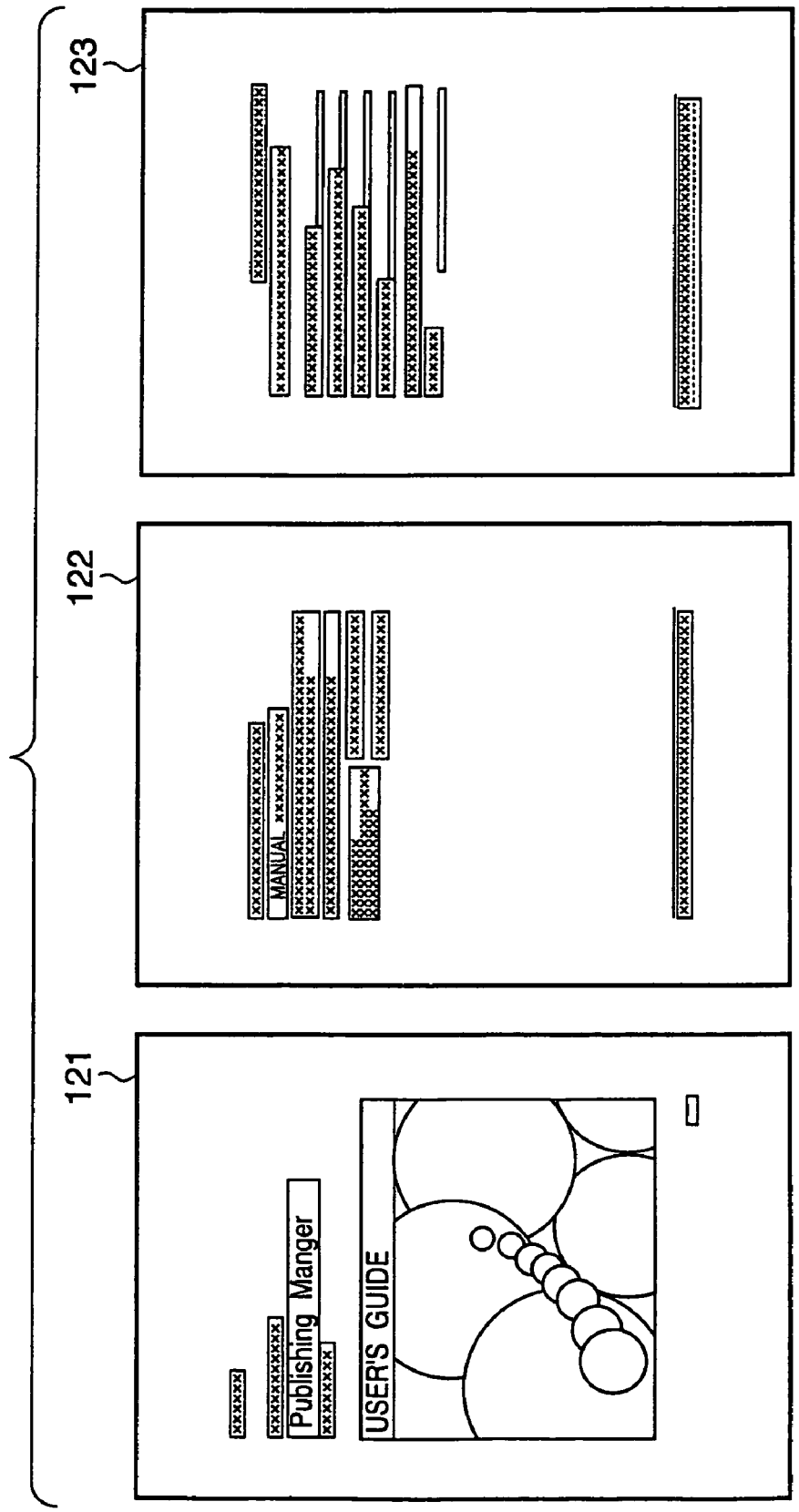
FIG. 12 shows a result of performing block selection processing as a function of a document editing application 2704, for an entire scan image of an acquired document.

FIG. 12 shows a result of performing block selection processing as a function of the document editing application 2704, for an entire scan image of an acquired document sheet. Here, the block selection processing is a technique used as processing to be performed prior to processing for reading characters from an image (OCR processing) or an image compression processing. That is, it is area division processing for reading an image and separating the image into rectangle areas having a rendering object, such as character areas, image areas and graphic areas. Recognition of a rendering object is a well-known technique, and therefore detailed description thereof will be omitted. In the recognition of a rendering object, thresholds for the size and a pixel density for extracting a rendering target are provided. For example, an object with a size or a density equal to or below the threshold is treated as a dust (black dot) so that it is not extracted as a rendering target area in the area division.

When OCR processing as a function of the document editing application 2704 is performed, characters of a separated character area are recognized and converted to character codes. When image compression processing is performed, it is possible to realize a low compression rate and a high image quality by applying a suitable compression algorithm to each of the character areas, the image areas and the graphic areas. For example, in FIG. 12, six rectangle blocks are set for the first page 121.

Figure 13:
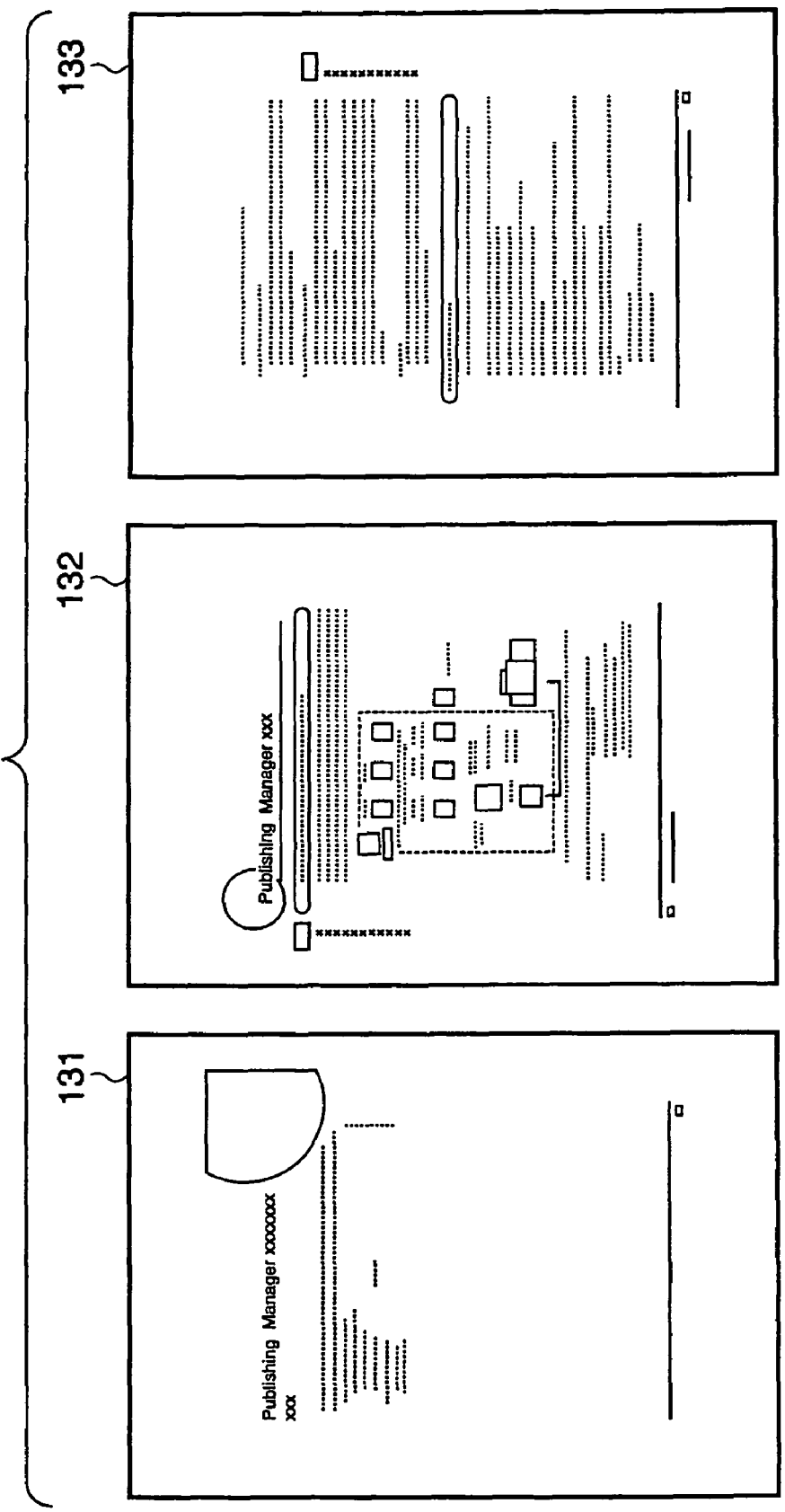
FIG. 13 shows a result of performing block selection processing for a part of a scan image acquired by the document editing application 2704.

FIG. 13 shows a result of performing the block selection processing for a part of a scan image of a document sheet acquired by the document editing application 2704. That is, FIG. 13 shows an example in which the block selection has been performed only for the lower one-fourth of the scan image. In the example shown in FIG. 13, the block selection processing has been performed only for the footer portion.

For example, in the first page 131 shown in FIG. 13, two blocks of a vertical line separating the text and the footer and a page number are recognized by performing such block selection processing. In each of the second and third pages 132 and 133 shown in FIG. 13, three blocks of a vertical line, a page number and a chapter title are recognized.

Figure 14:
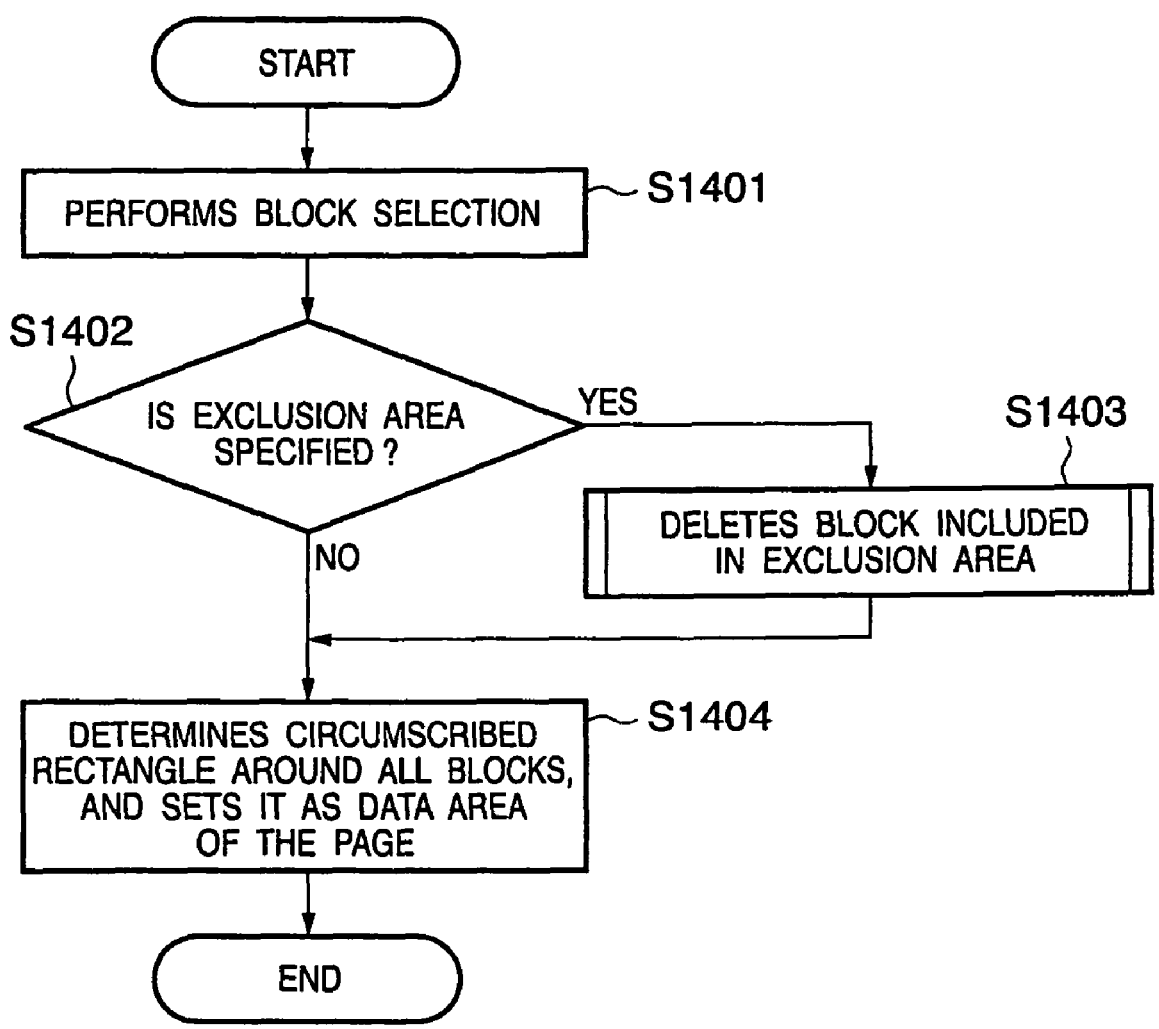
FIG. 14 is a flowchart for illustrating a procedure for determining a circumscribed rectangle including data (area having color bits other than white bits) on each page of a document.

FIG. 14 is a flowchart for illustrating a procedure for determining a circumscribed rectangle including data (area having color bits other than white bits) on each page of a document.

First, the document editing application 2704 performs the block selection processing as described above (step S1401). By this block selection processing, the entire scan image is divided into one or more blocks as shown in FIG. 12.

Next, the document editing application 2704 determines whether or not an exclusion area is specified (step S1402). The exclusion area can be specified with the use of a detailed settings window 2201 for setting an adjustment basis, which is provided by the document editing application 2704, as described later with reference to FIG. 22. For example, if it is set that "a reference position is determined only by a header or footer position" in the window in FIG. 22, then the block selection is performed only for the footer portion, and the upper part area of the page becomes an exclusion area, as shown in FIG. 13. As a result, if it is determined that an exclusion area is specified (Yes), then the document editing application 2704 deletes a block included in the exclusion from candidate blocks for image position adjustment (step S1403). In this way, by deleting a block included in an exclusion area from candidates for image position adjustment, only blocks in specified areas are left in the image. Then, the process proceeds to step S1404.

On the other hand, if it is determined that an exclusion area is not specified (No), or after deletion of a block candidates for image position adjustment at step S1403, the document editing application 2704 calculates a circumscribed rectangle around the blocks remaining as candidates for image position adjustment and set the circumscribed rectangle as a data area of the page. If the upper left coordinate of the I-th block is assumed to be (xai, yai), and the lower right coordinate thereof is assumed to be (xbi, ybi), a rectangle with the upper left coordinate of (min(xai), min(yai)) and the lower right coordinate of (max(xbi), max(ybi)) is the circumscribed rectangle, in the case of an coordinate system where the origin is at the left upper corner. The min(xai) and min(yai) are the minimum values of the left side x coordinate and the upper side y coordinate, respectively, of all the blocks. The max (xbi) and max(ybi) are the maximum values of the right side coordinate and the lower side coordinate, respectively, of all the blocks.

Figure 15:
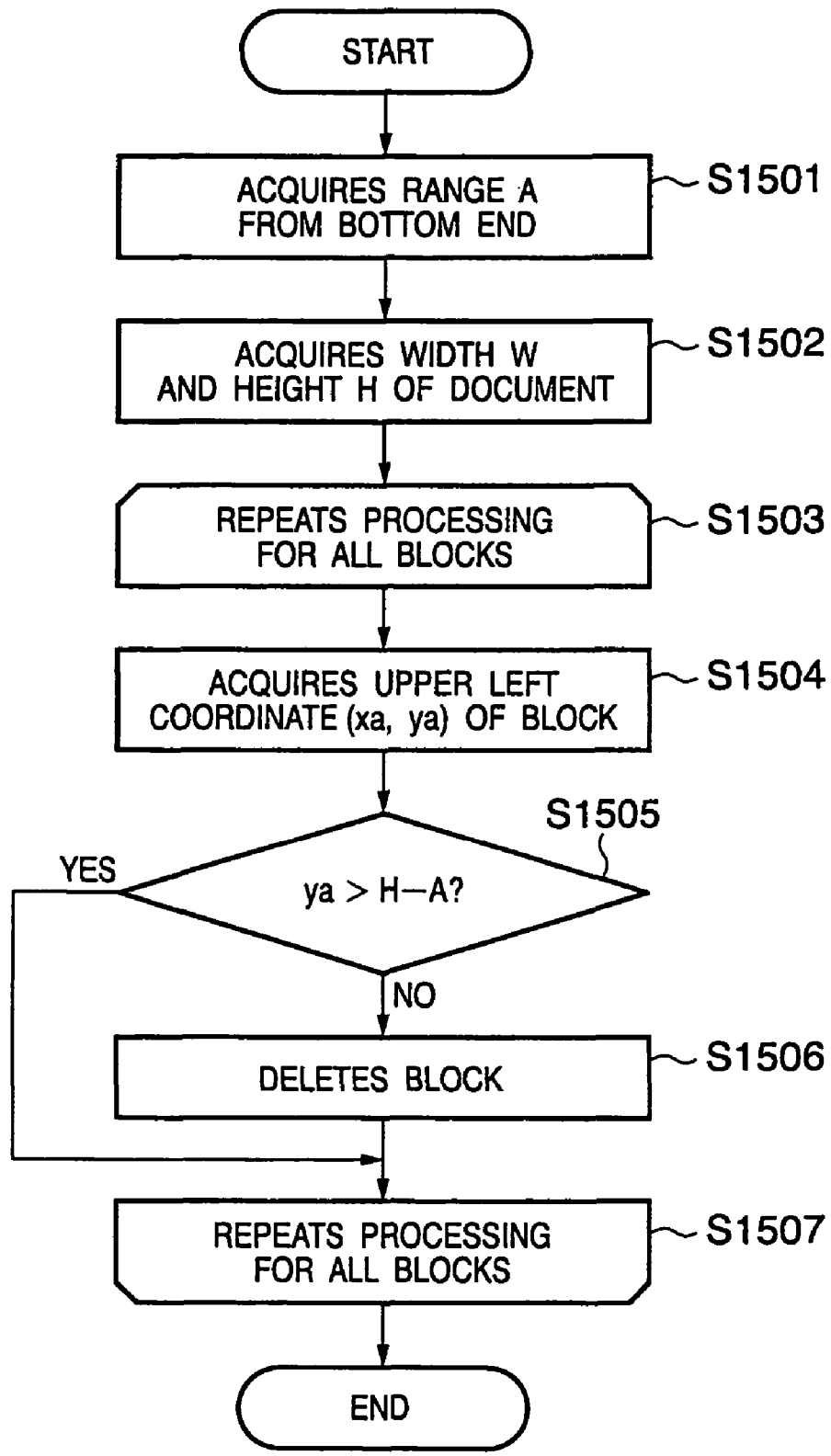
FIG. 15 is a flowchart for illustrating the details of processing for deleting a block from block candidates for image position adjustment (step S1403) in the flowchart shown in FIG. 14.

FIG. 15 is a flowchart for illustrating the details of the processing for deleting a block from block candidates for image position adjustment (step S1403) in the flowchart shown in FIG. 14. That is, it is an example of processing to be performed when the block selection is performed only for the footer portion as described above. It is assumed that the footer area is specified to be within the range from the bottom end of the document to XX (mm) therefrom.

First, the document editing application 2704 acquires a range value A which indicates how long distance from the bottom end of the document sheet is specified for a footer area (step S1501). Next, the document editing application 2704 acquires values of a width W and a height H of the document sheet (step S1502). These values can be determined from the resolution, the horizontal and vertical number of pixels and the like of an image currently being processed.

Next, the process proceeds to step S1503, and the processings from steps S1504 to S1506 are repeated sequentially for all the blocks on the image being processed as a loop process. The processings within the repetition will be described below.

First, the document editing application 2704 acquires the upper left coordinate (xa, ya) of a block currently being processed (step S1504). Next, the document editing application 2704 checks the positional relation between the coordinate value of ya and the height of the footer area (step S1505). As a result, if the value of ya is larger than the height of the footer area (Yes), then it is determined that the whole rectangle block is included in the footer area, and the process proceeds to step S1507. On the other hand, if it is determined that even only a part of the rectangle block is beyond the footer area (No), then the block is deleted from candidates for image position adjustment (step S1506).

Figure 16:
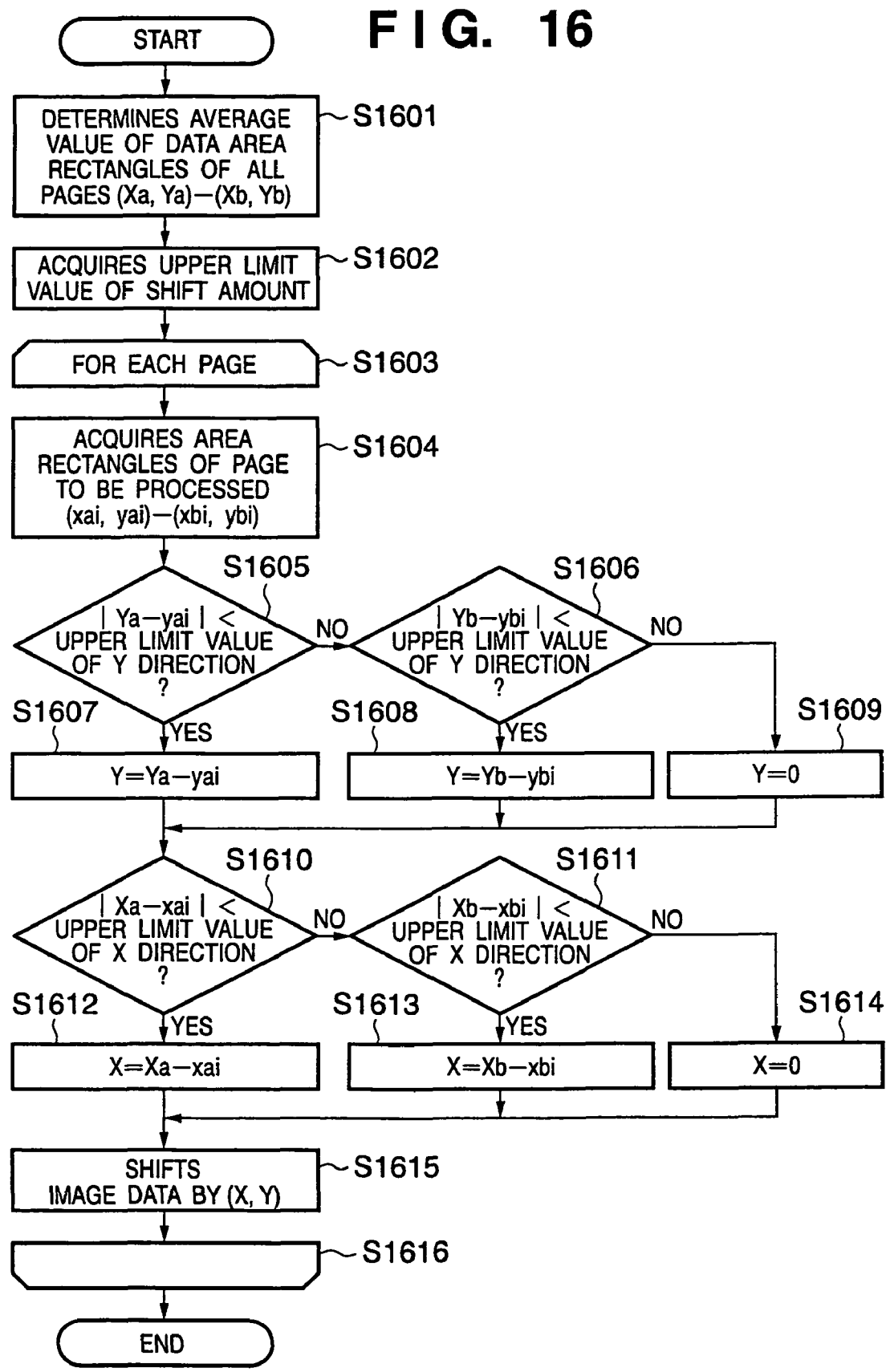
FIG. 16 is a flowchart for illustrating a procedure for shifting document data.

FIG. 16 is a flowchart for illustrating a procedure for shifting document data. First, the document editing application 2704 determines an average value of circumscribed rectangles on all pages (step S1601). In this case, the average of circumscribed rectangles is a value obtained by averaging X and Y coordinates of the upper left coordinates and the lower right coordinates of the circumscribed rectangles of the respective pages determined by the processing based on the flowchart shown in FIG. 14. That is, if it is assumed that the average upper left coordinate of the circumscribed rectangles is (Xa, Ya), the average lower right coordinate thereof is (Xb, Yb), the upper left coordinate of the circumscribed rectangle of the i-th page is (xai, yai), the lower right coordinate thereof is (xbi, ybi), and the total number of pages is N, then:

$$Xa=(xa1+xa2+xa3+\ldots+xan)/N;$$

$$Ya=(ya1+ya2+ya3+\ldots+yan)/N;$$

$$Xb=(xb1+xb2+xb3+\ldots+xbn)/N; \text{ and}$$

$$Yb=(yb1+yb2+yb3+\ldots+ybn)/N.$$

Then, the document editing application 2704 acquires the upper limit value of a shift amount (step S1602). The shift amount calculation in this embodiment is performed with reference to the upper left coordinate or the lower right coordinate. Therefore, in the case of a page the entire surface of which shows an image or a page on which only one line of rendering data exists, too much shift may be caused by the circumscribed rectangle. In order prevent such a case (that is, the case where too much shift may be caused) from being caused, an upper limit value of a shift amount is provided. This upper limit value of a shift amount may be specified by the user or determined by the system side.

The processings from steps S1603 to S1616 are performed as a loop process to be repeated for each page. First, one page to be processed is selected and a circumscribed rectangle of the page determined in the procedure shown in the flowchart of FIG. 14 is acquired (step S1604).

Next, the document editing application 2704 determines whether or not the difference between the upper end position of the average rectangle and the upper end of the page is below the threshold (upper limit value) acquired at step S1602 (step S1605). As a result, if the difference is below the threshold (Yes), then the vertical shift amount Y is determined to be Ya−yai (step S1607). On the other hand, if the difference exceeds the threshold (No), then it is further determined whether or not the difference between the lower end position of the average rectangle and the lower end position of the page is below the threshold (upper limit value) acquired at step S1602 (step S1606).

As a result, if the difference is below the threshold (Yes), then the vertical shift amount Y is determined to be Yb−ybi (step S1607). On the other hand, if the difference exceeds the threshold (No), then the vertical shift amount Y is determined to be 0 (step S1609). Then, after the vertical shift amount is calculated through steps S1607 to S1609, the process proceeds to step S1610 in any case.

At step S1610, the document editing application 2704 determines whether or not the difference between the left end position of the average rectangle and the left end of the page is below the threshold (upper limit value) acquired at step S1602. As a result, if the difference is below the threshold (Yes), then the horizontal shift amount X is determined to be Xa−xai (step S1612). On the other hand, if the difference exceeds the threshold (No), then the document editing application 2704 determines whether or not the difference between the right end position of the average rectangle and the right end position of the page is below the threshold (upper limit value) acquired at step S1602 (step S1611).

As a result of the determination at step S1611, if the difference is below the threshold (Yes), then the horizontal shift amount X is determined to be Xb−xbi (step S1613). On the other hand, if the difference exceeds the threshold (No), then the horizontal shift amount X is determined to be 0 (step S1614).

After the horizontal shift amount X is determined through steps S1612, S1613 and S1614, processing for shifting the entire image is performed with the use of the vertical and horizontal shift amounts determined by the processings described above (step S1615). Then, the processings from step S1603 are repeated for the next page (steps S1603 to S1616).

The shift amounts X and Y are determined based on the upper left and lower right coordinates in the process based on the flowchart shown in FIG. 16. In addition, it is also possible to determine the shift amounts based on the difference between the gravity center position of a rectangle, that is, ((xai+xbi)/2, (yai+ybi)/2), and the gravity center position of the average rectangle ((Xa+Xb)/2, (Ya+Yb)/2).

In many cases, content of document data used for ordinary printing is written from the upper left toward the lower right direction, and therefore, a desirable result can be more possibly obtained by processing which gives priority to the upper left. In the case where centering is preferable, such as the case of image data, a desirable result can be more possibly obtained by using the gravity center position as a basis and setting a threshold higher.

The user may specify an algorithm. It is also possible to implement the system with a variation, such as for switching algorithms based on the rate of character blocks obtained by the block selection processing.

Figure 17:
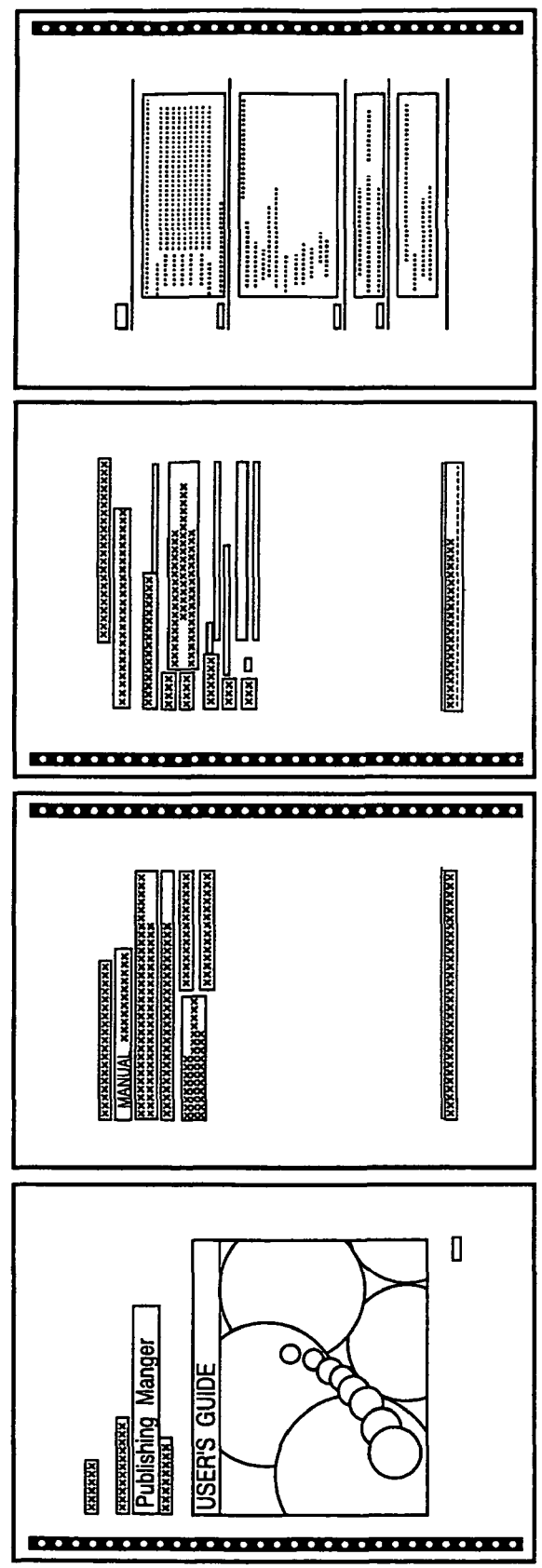
FIG. 17 shows an example of image data obtained by reading a double-sided printed document.

FIG. 17 shows an example of image data obtained by reading a double-sided printed document. As shown in FIG. 17, the read document is in left side open configuration, and punch holes are provided on the left side of odd pages. In the case of image data obtained by reading such a document, by determining a standard position as described above only based on the right and left ends with punch holes, the accuracy of positioning is improved for a document constituted by non-standard pages.

In this case, the range value A is acquired not from the bottom end but from the right and left ends in the processing at step S1501 of the flowchart shown in FIG. 15. Furthermore, in the processing at step S1505, processing for comparing the block xa and the difference between the document width W and the range value A (W-A) can be performed so that only blocks at the right and left ends of the sheet may be left.

Figure 18:
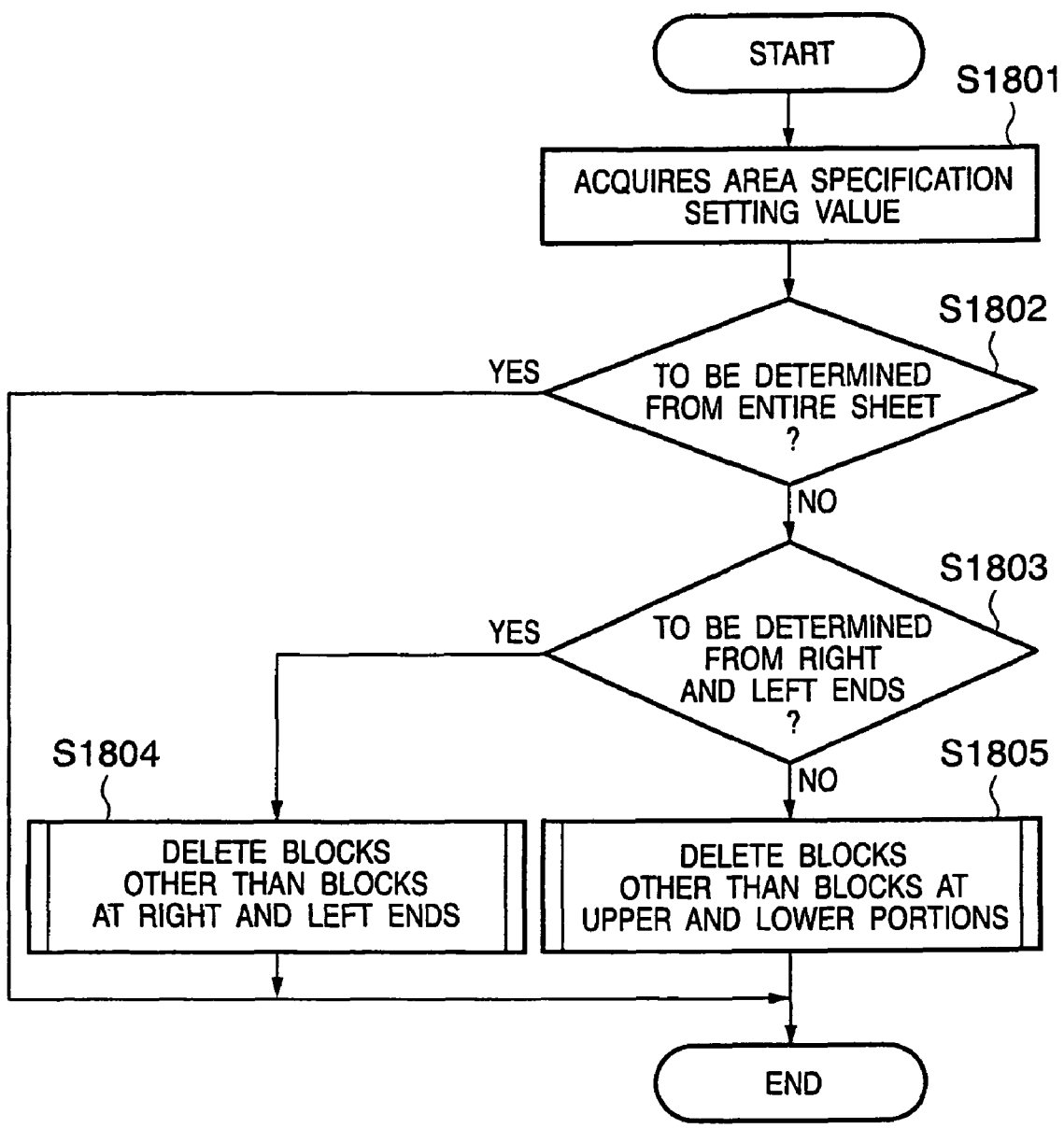
FIG. 18 is a flowchart for illustrating an example of a procedure for switching among reference position determination processings in a system enabling a reference position to be determined in multiple kinds of area.

FIG. 18 is a flowchart for illustrating an example of a procedure for switching among reference position determination processings in a system enabling a reference position to be determined in multiple kinds of area. Here, it is assumed that any of the following three kinds of area can be specified: an entire sheet, a header or footer portion, and a right or left end of a sheet.

First, the document editing application 2704 acquires an area classification setting value in order to know in which area the reference position should be determined (step S1801). Then, the document editing application 2704 determines whether or not the area classification setting value acquired at step S1801 indicates specification of determination from an entire sheet (step S1802). As a result, if it is set that "a reference position is to be determined from an entire sheet" in FIG. 22, that is, it is set that determination should be made from an entire sheet (Yes), then the process ends without doing anything. On the other hand, if it is not set that determination should be made from an entire sheet (No) then the document editing application 2704 further determines whether or not it is set that determination should be made from right and left ends of a sheet (step S1803). That is, it is determined whether or not it is set that "a reference position is to be determined only from a right or left end position" in FIG. 22.

As a result of the determination at step S1803, if it is set that determination is to be made from a right or left end of a sheet (Yes), then the document editing application 2704 performs processing for deleting blocks other than the right and left end blocks from image position adjustment candidate blocks (step S1804). On the other hand, if it is not set that determination is made from a right or left end (No), then it is determined that determination is to be made from a header or footer portion, and blocks other than upper and lower portion blocks, which correspond to a header and a footer, are deleted from the image position adjustment candidates (step S1805). Each of the processings at step S1804 and step S1805 is a variation of the processing already described with the use of FIG. 15.

Figure 19:
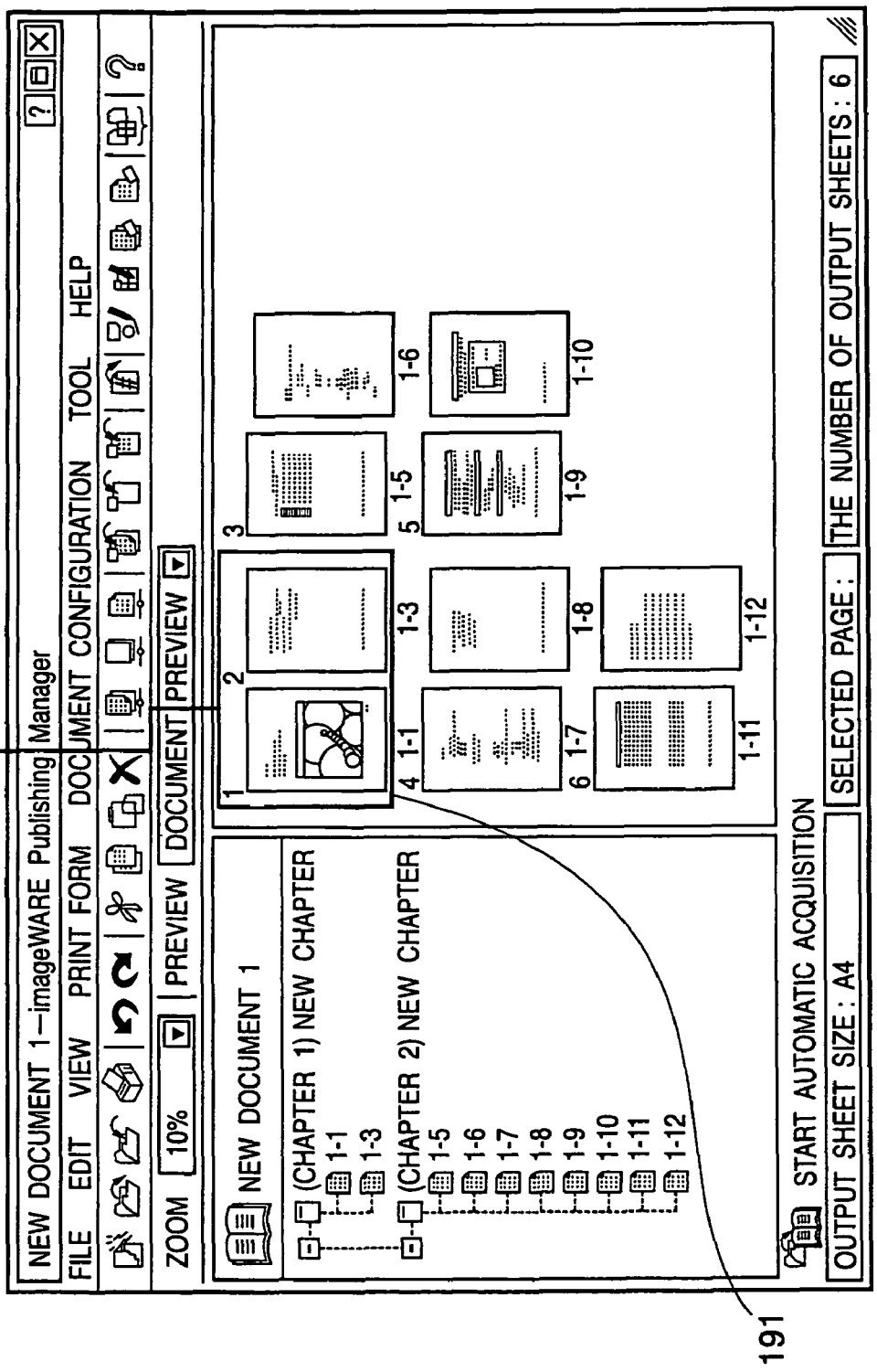
FIG. 19 shows a display example of a document in which a single-sided printed portions and a double-sided printed portion are mixed.

FIG. 19 shows a display example of a document in which a single-sided printed portion and a double-sided printed portion are mixed. In FIG. 19, images corresponding to two pages surrounded by a frame 191 are portions to be single-sided printed, and other images are portions to be double-sided printed. Even in the case of a document with a complicated configuration as shown in FIG. 19, it is possible to perform position adjustment separately for each of the front side and the back side.

Figure 20:
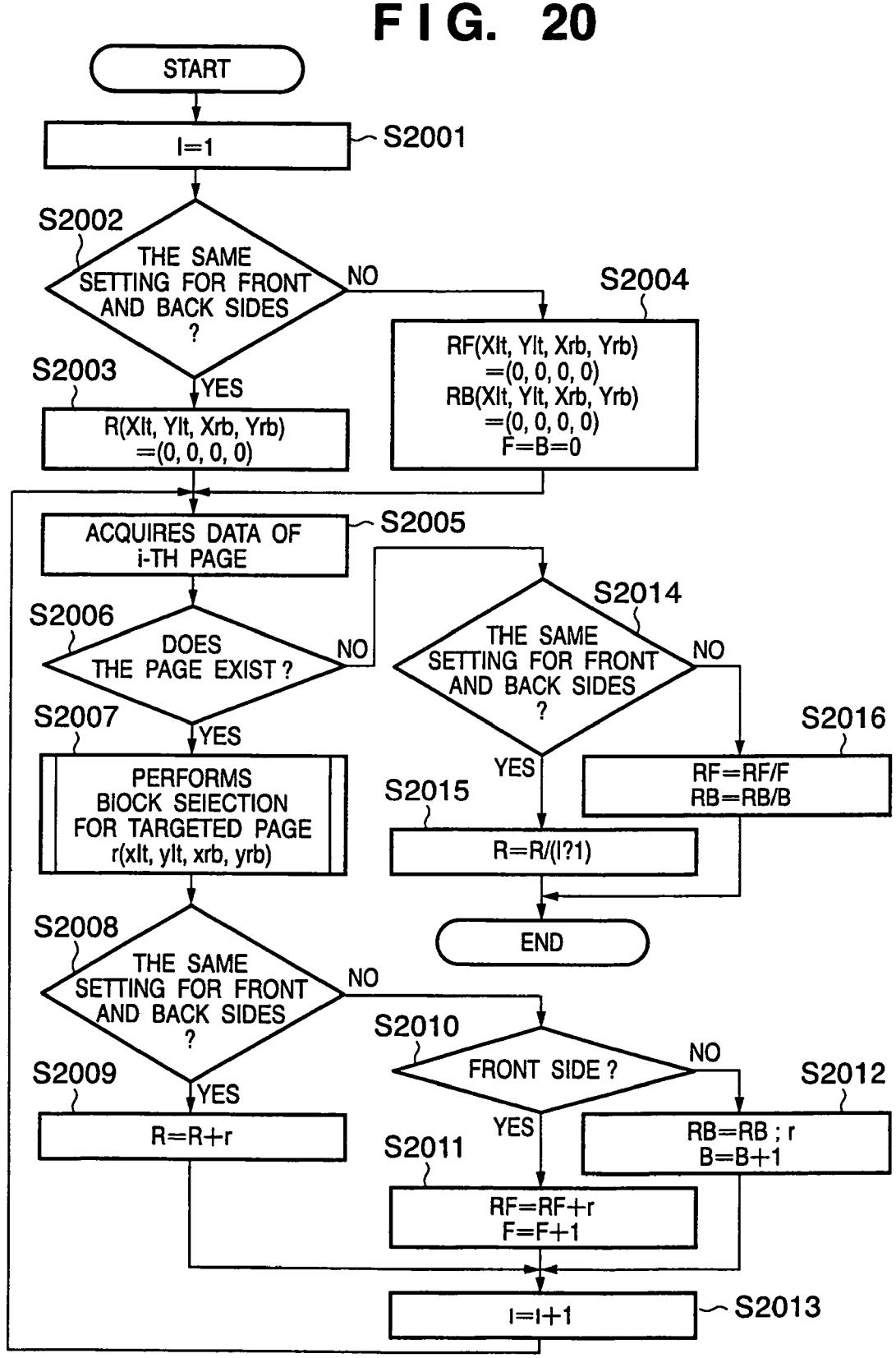
FIG. 20 is a flowchart for illustrating processing for determining a standard position for each of the front side and the back side of a document in which a single-sided printed portions and a double-sided printed portion are mixed as shown in FIG. 19.

FIG. 20 is a flowchart for illustrating processing for determining a standard position for each of the front side and the back side of a document in which a single-sided printed portion and a double-sided printed portion are mixed as shown in FIG. 19. In this process, a position indicated by average values of the upper left coordinates and the lower right coordinates of the circumscribed rectangles around blocks of respective pages is assumed as a standard position.

First, a counter 1 is initialized so that 1 is substituted (step S2001). Next, the document editing application 2704 determines whether the same standard position should be set for the front and back sides or a standard position should be determined separately for each (step S2002). As a result, if it is determined that the standard position should be similarly determined for the front and back sides (Yes), then variable initialization processing for recording the sum of the number of block rectangles of each page is performed (step S2003). At step S2003, a set R of the four values of the X coordinate Xlt and the Y coordinate Ylt of the upper left apex of a rectangle, and the X coordinate Xrb and the Y coordinate Yrb of the lower right apex thereof is initialized so that all the values therein become 0.

On the other hand, if it is determined at step S2002 that the standard position should be determined separately for each of the front side and the back side (No), then the document editing application 2704 performs the variable initialization processing for recording the total sum of block rectangles of each of the front side and the back side and counters F and B initialization processing for counting the number of front side pages and the number of back side pages (step S2004). To obtain the total sum of the rectangles on the front side and that of the back side, all the four values of the X coordinate Xlt and the Y coordinate Ylt of the upper left apex of each rectangle, and the X coordinate Xrb and the Y coordinate Yrb of the lower right apex thereof, are initialized to be 0. The process described above is a preparative process.

Next, through steps S2005 to S2013, processing for determining the sum of block rectangles on each page is performed.

First, the I-th page data is acquired (step S2005). In the example shown by this flowchart, a page counter has one origin. Then, end determination is made (step S2006). In this embodiment, if the I-th page does not exist, then it is determined that there is data corresponding to pages up to the immediately previous page, that is, data corresponding to (I−1) pages, without especially considering error processing.

As a result, if it is determined that the page exists (Yes), then the document editing application 2704 performs the block selection processing for the I-th page (step S2007). Details of the block selection processing have already been described above with the use of FIG. 14. The circumscribed rectangle around blocks determined by this step is denoted by r.

After the block selection processing (step S2007), determination similar to the processing of step S2002 is made (step S2008). As a result, if the same setting is made for the front and back sides without distinction (Yes), then the document editing application 2704 adds the circumscribed rectangle r determined at step S2007 to the variable R holding the total sum to obtain a new sum (step S2009). On the other hand, if setting is separately made for the front side and the back side (No), then the document editing application 2704 further determines whether or not the I-th page is front-side data (step S2010).

As the most easy method for determining whether the I-th page is a front side page or a back side page, there is a method in which the page is determined to be a front side page if the counter I shows an odd number and determined to be a back side page if the counter I shows an even number. For example, in the case where single-sided printing is specified for a part of pages as shown in FIG. 19, all of the part to be single-sided printed is determined to be front side pages, and, as for a part to be double-sided printed, it is determined that the top of the part is a front side page, and the next page is to be a back side page.

If it is determined that the I-th page is a front side page (Yes), then the document editing application 2704 adds the coordinates of the rectangle r determined at step S2007 to the variable RF holding the total sum of the rectangle coordinates of front side pages, and increments the counter F for counting the number of front side pages (step S2011). On the other hand, if it is determined that the I-th page is a back side page (No), then the document editing application 2704 adds the coordinates of the rectangle r determined at step S2007 to the variable RB holding the total sum of the rectangle coordinates of back side pages, and increments the counter B for counting the number of back side pages (step S2012).

After the processings of steps S2011 and S2012, the page number counter I is incremented to proceed to processing of the next page (step S2013). Then, the process returns to the processing of step S2005.

If it is determined at step S2006 that the total sum of rectangles of all the pages and the number of pages have been counted and there is no more page (No), then the process proceeds to step S2014. At step S2014, determination similar to step S2002 is made again. As a result, if the same setting is to be made without distinction between the front side and the back side (Yes), then an average coordinate is determined by dividing the variable R holding the total sum of coordinates of rectangles of all the pages by the number of pages (step S2015). On the other hand, if setting is to be made for the front side and the back side with distinction made therebetween (No), then average coordinates of the front side and the back side are determined by dividing the variable RF holding the total sum of the rectangle coordinates of front side pages by the number of front-side data and dividing the variable RB holding the total sum of the rectangle coordinates of back side pages by the number of back-side data, respectively (step S2016). It is necessary to incorporate error processing at implementation so that the variables are not divided by 0 at steps S2015 and S2016.

In the processing based on the flowchart shown in FIG. 20, the standard position is determined by simple arithmetic averaging. In addition to this, variations can be applied, such as determination by square mean calculation, determination not with the use of the upper left and lower right coordinates but with the use of the upper left coordinate, width and height, and deletion of data of pages with the position and size far from the average position and size before calculation of the standard position.

Figure 21:
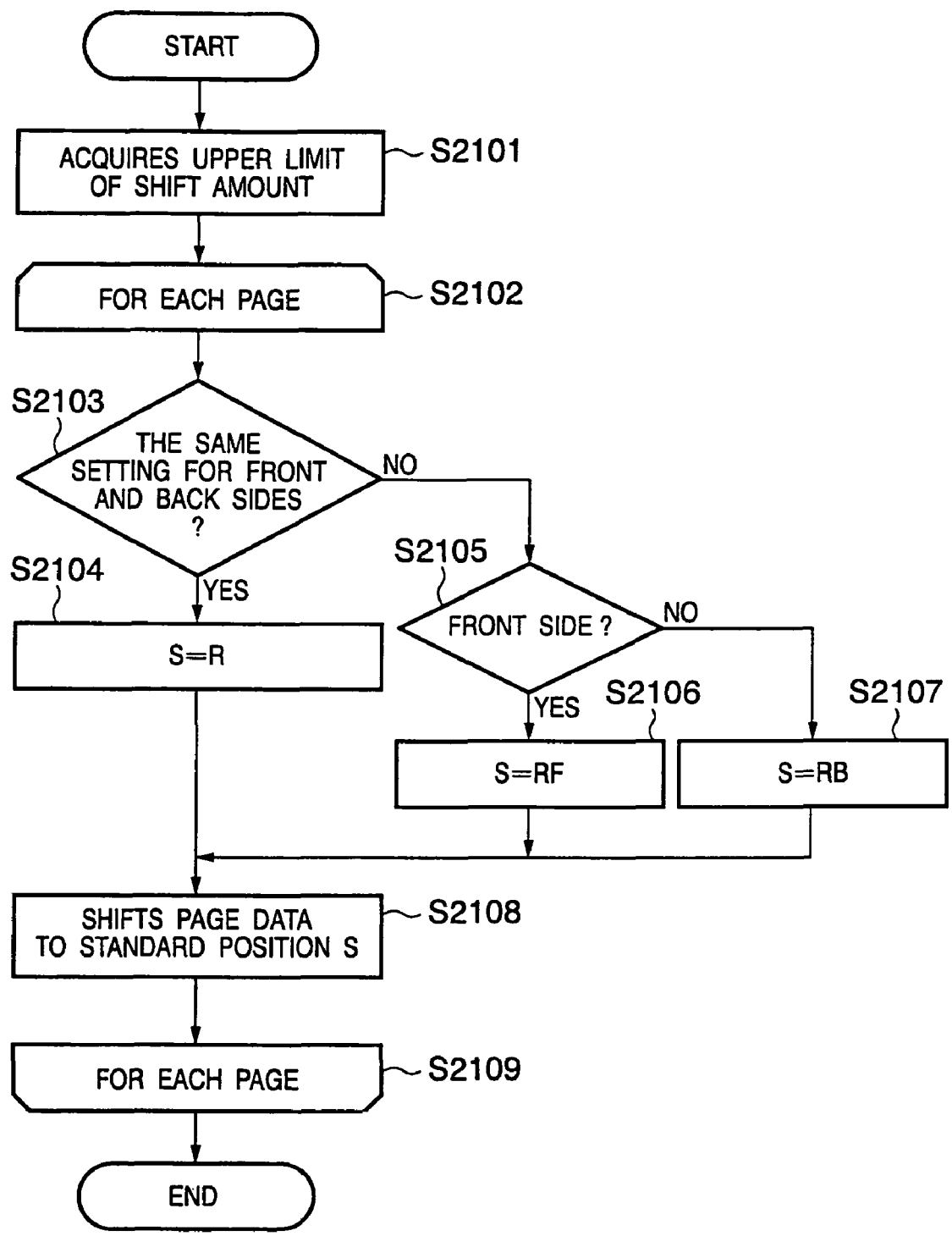
FIG. 21 is a flowchart for illustrating an example of processing for shift to the reference position determined by the processing shown in FIG. 20.

FIG. 21 is a flowchart for illustrating an example of processing for shift to the reference position determined by the processing shown in FIG. 20, and shows a control process by the document editing application 2704.

First, the document editing application 2704 acquires the upper limit value of a shift amount (step S2101). This upper limit value acquisition processing is similar to step S1602 of the flowchart shown in FIG. 16. The processings from steps S2102 to S2109 are repeated for each page of a document. Next, the process within the loop will be described.

First, the document editing application 2704 determines whether positioning at the same position or different positions is performed for the front and back sides of a page concerned (step S2103). As a result, if positioning at the same position is to be performed (Yes), then the set R determined by the processing of the flowchart shown in FIG. 20 is substituted into a set S of four values indicating the reference position (step S2104) for initialization, and the process proceeds to step S2108. On the contrary, if the same positioning is not set (No) for the front and back sides, then the document editing application 2704 further determines whether the target currently being processed is a front side page or a back side page (step S2105). As a result, if it is determined that the page is a front side page (Yes), then the reference position S is initialized with RF determined by the processing of the flowchart shown in FIG. 20 (step S2106), and the process proceeds to step S2108. On the other hand, if it is determined that the page is a back side page (No), then the reference position S is initialized with RB determined by the processing of the flowchart shown in FIG. 20 (step S2107), and the process proceeds to step S2108.

At step S2108, the document editing application 2704 positions the page currently being processed at the standard position S. The processing of step S2108 is similar to the processing from steps S1604 to S1615 of the flowchart shown in FIG. 16.

Figure 22:
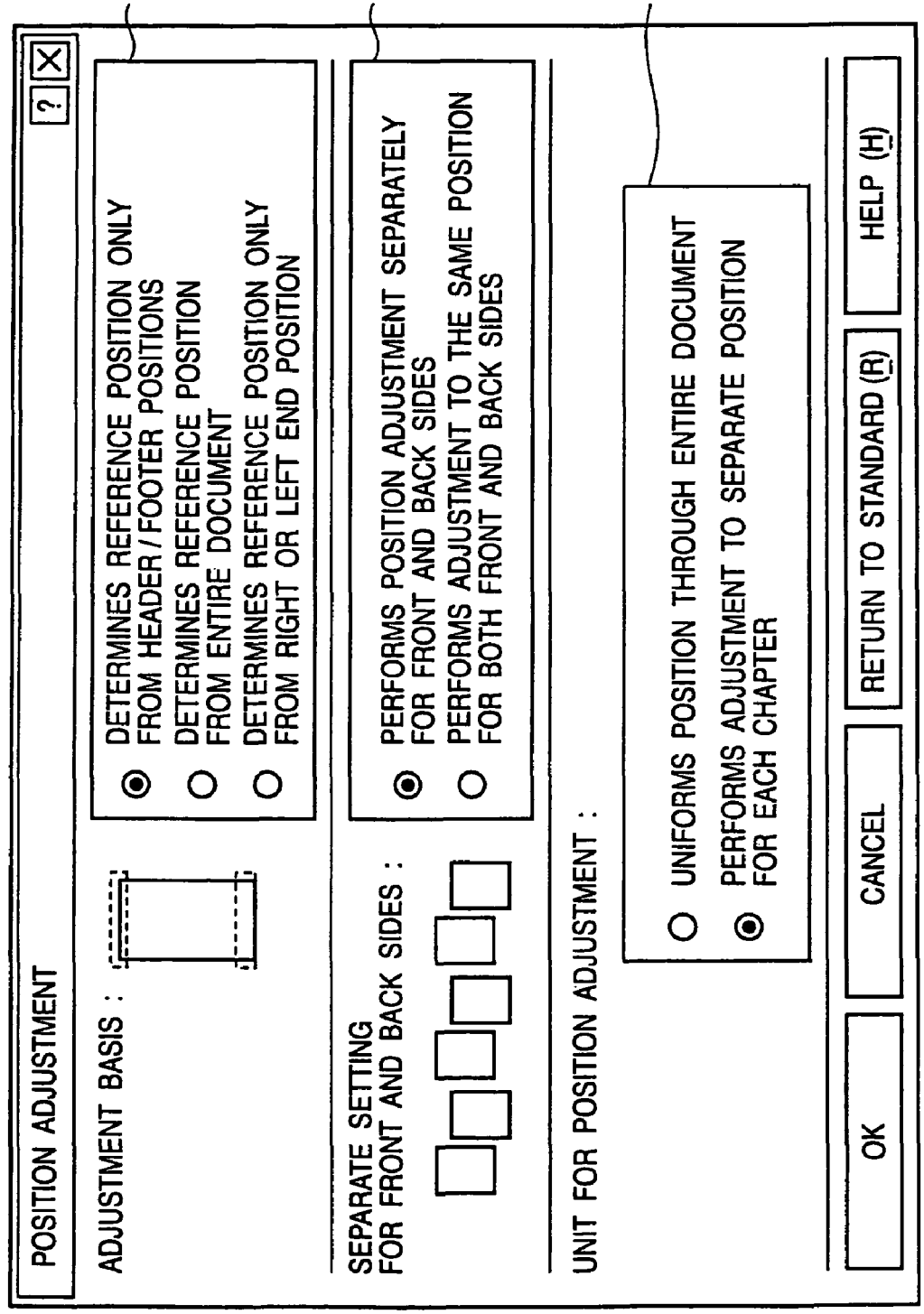
FIG. 22 shows an example of GUI for making settings for positioning processing in this embodiment.

FIG. 22 shows an example of GUI for making settings for positioning processing in this embodiment. In FIG. 22, a radio button 2201 is a button for specifying whether or not to limit a reference position only to a partial area in determining the reference position. In this embodiment, there are three options for the specification as follows:

(1) only blocks in header and footer areas are used;
(2) blocks of on an entire page are used (not limited to a partial area); and
(3) only blocks in right and left end areas are used.

Branching of the processing for determining a reference area based on each setting has been already described above with the use of FIG. 18. In the case of the setting (1), it is determined at step S1803 of the flowchart in FIG. 18 that blocks are not on right and left end portions (No), and blocks other than those on upper and lower portions are deleted (step S1805). In the case of the setting (2), it is determined at step S1802 of the flowchart that it is set that determination is to be made from an entire sheet (Yes). In the case of the setting (3), it is determined at step S1803 of the flowchart that determination is to be made from the right and left end portions of the sheet (Yes), and blocks other than those on the right and left end portions are deleted (step S1804).

In FIG. 22, a radio button 2202 is a button for setting whether or not shift to a different reference position is to be made in the case of a front side page and in the case of a back side page. In this embodiment, the following two options are provided:

(1) position adjustment is performed separately for the front side and the back side; and
(2) position adjustment to the same position is performed for both of the front and back sides. The difference between processings according to these setting values has been already described above with the use of FIGS. 20 and 21.

Furthermore, in FIG. 22, a radio button 2203 is a button for the unit for which position adjustment is performed. In this embodiment, the following two options are provided:

(1) the position is uniformed through an entire document; and
(2) position adjustment is performed separately for each chapter. That is, in the case of (1), a reference position is determined for an entire document, and position adjustment to the position is performed for each page. In the case of (2), a reference position is determined by taking statistics of circumscribed rectangles separately for each chapter, and position adjustment to the position is performed for each page within the chapter.

Figure 23:
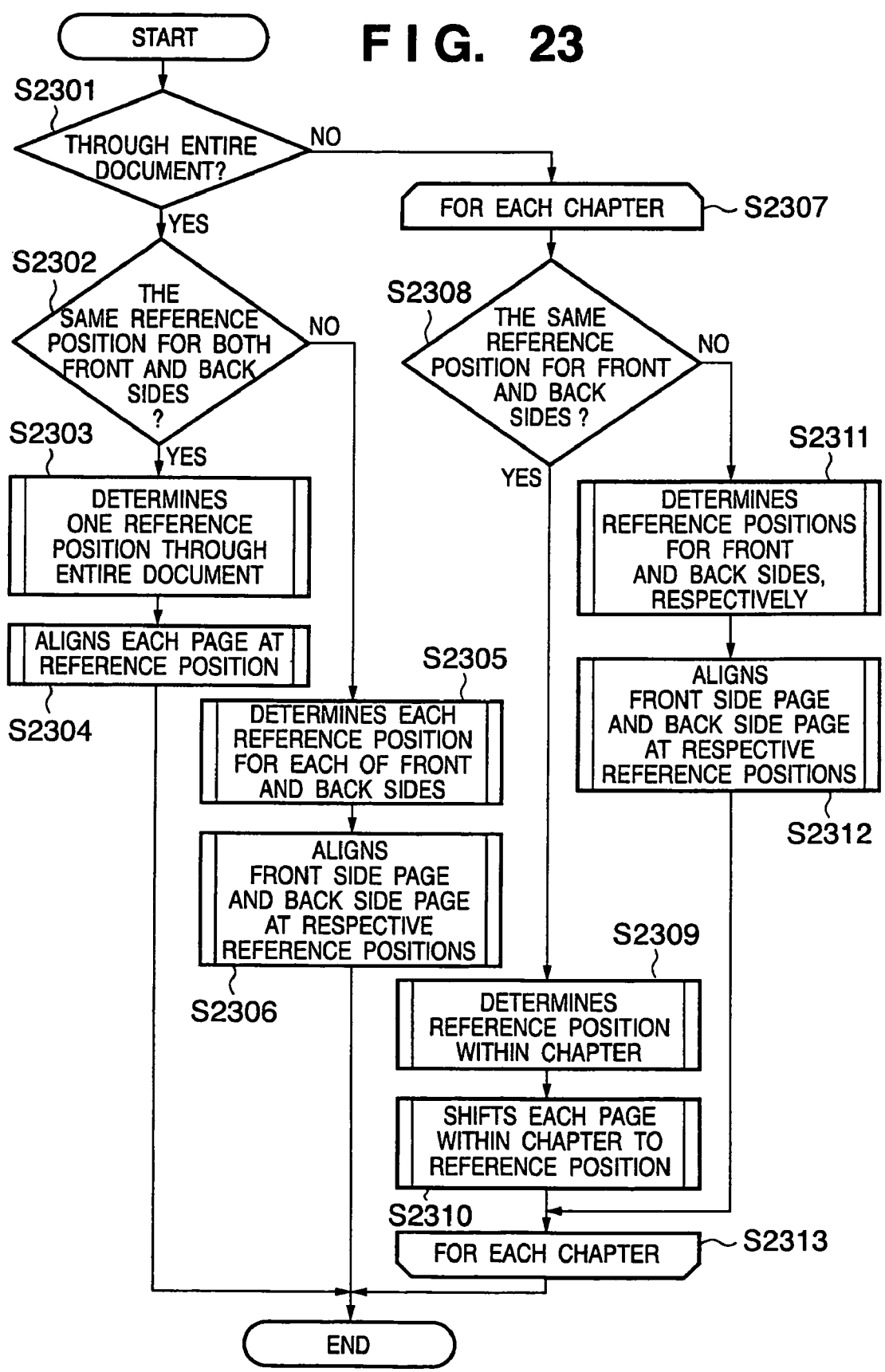
FIG. 23 is a flowchart for illustrating an example of switching processing according to user settings.

FIG. 23 is a flowchart for illustrating an example of switching processing according to user settings. Description will be made below on difference in processing according to settings of the radio button 2202 and the radio button 2203 shown in FIG. 22.

First, the document editing application 2704 determines what the setting value of the radio button 2203 shown in FIG. 22 is (step S2301). As a result, if it is set that "the position is uniformed through an entire document" (Yes), it is then determined what the setting value of the radio button 2202 shown in FIG. 22 is (step S2302). On the other hand, if it is set that "adjustment to a separate position is performed for each chapter" (No), then the process proceeds to step S2307.

That is, if the setting value of the radio button 2202 shown in FIG. 22 is "position adjustment to the same position is performed for both of the front and back sides" (Yes) at step S2303, then the process proceeds to step S2303. On the other hand, if the setting value of the radio button 2202 shown in FIG. 22 is "position adjustment is performed separately for the front side and the back side" (No), then the process proceeds to step S2305.

At step S2303, the document editing application 2704 determines one reference position through an entire document, and then shifts each page to the determined reference position to align all the pages at the position (step S2304). The processings of steps S2303 and S2304 have been already described above with the use of FIG. 16.

On the other hand, at step S2305, processing for determining a separate reference position for each of the front side and the back side is performed. The processing of step S2305 has been described above with the use of FIG. 20. Next, processing for aligning each of the front side and the back side at each reference position is performed (step S2306). The processing of step S2306 corresponds to the processing described with the use of FIG. 21.

The process from steps S2307 to S2313 is a loop which repeats for each chapter. Next, processing within the loop will be described. First, the document editing application 2704 determines what the setting value of the radio button 2202 shown in FIG. 22 is (step S2308). As a result, if it is set that "position adjustment is performed separately for the front side and the back side" (No), then the process proceeds to step S2311, and if it is set that "position adjustment to the same position is performed for both of the front and back sides" (Yes), then the process proceeds to step S2309.

At step S2309, a reference position within a chapter is determined. The processing of step S2309 is similar to the processing of step S2303 except that the top page to the last page of a chapter are targeted. Then, each page in the chapter is shifted to the reference position (step S2310). The processing of step S2310 is also similar to the processing of step S2304 except that the reference position is the reference position for the chapter determined at step S2309 and that the range targeted by the shifting processing is limited only to the chapter.

The processing of step S2311 and the subsequent processing of step 2312 are also similar to the processing of step S2305 and the processing of step S2306 described above, respectively, though the range targeted by the processing is limited only to the chapter.

Figure 24:
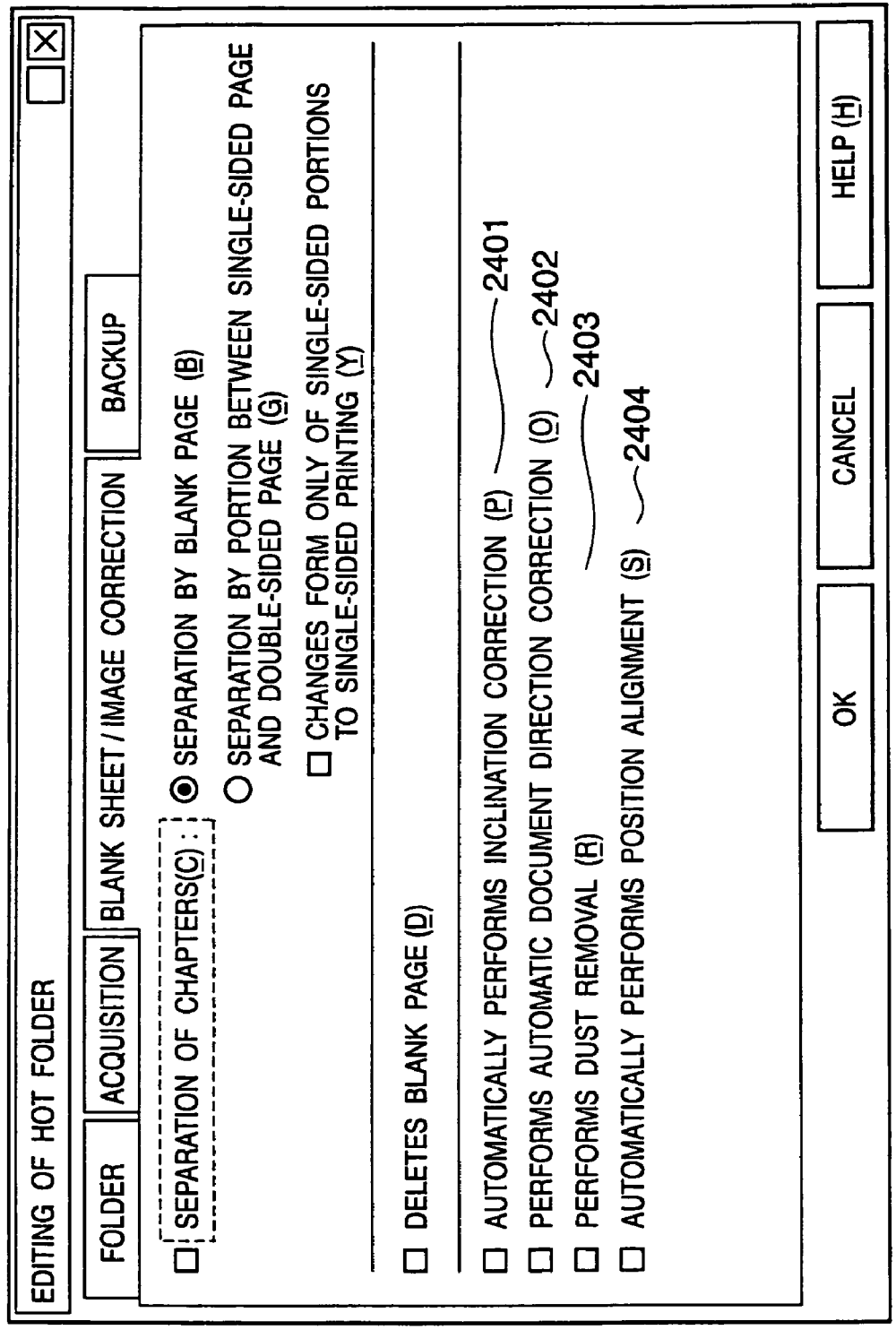
FIG. 24 shows an example of GUI for performing image processing by means of an application referred to as a hot folder in this embodiment.
Figure 25:
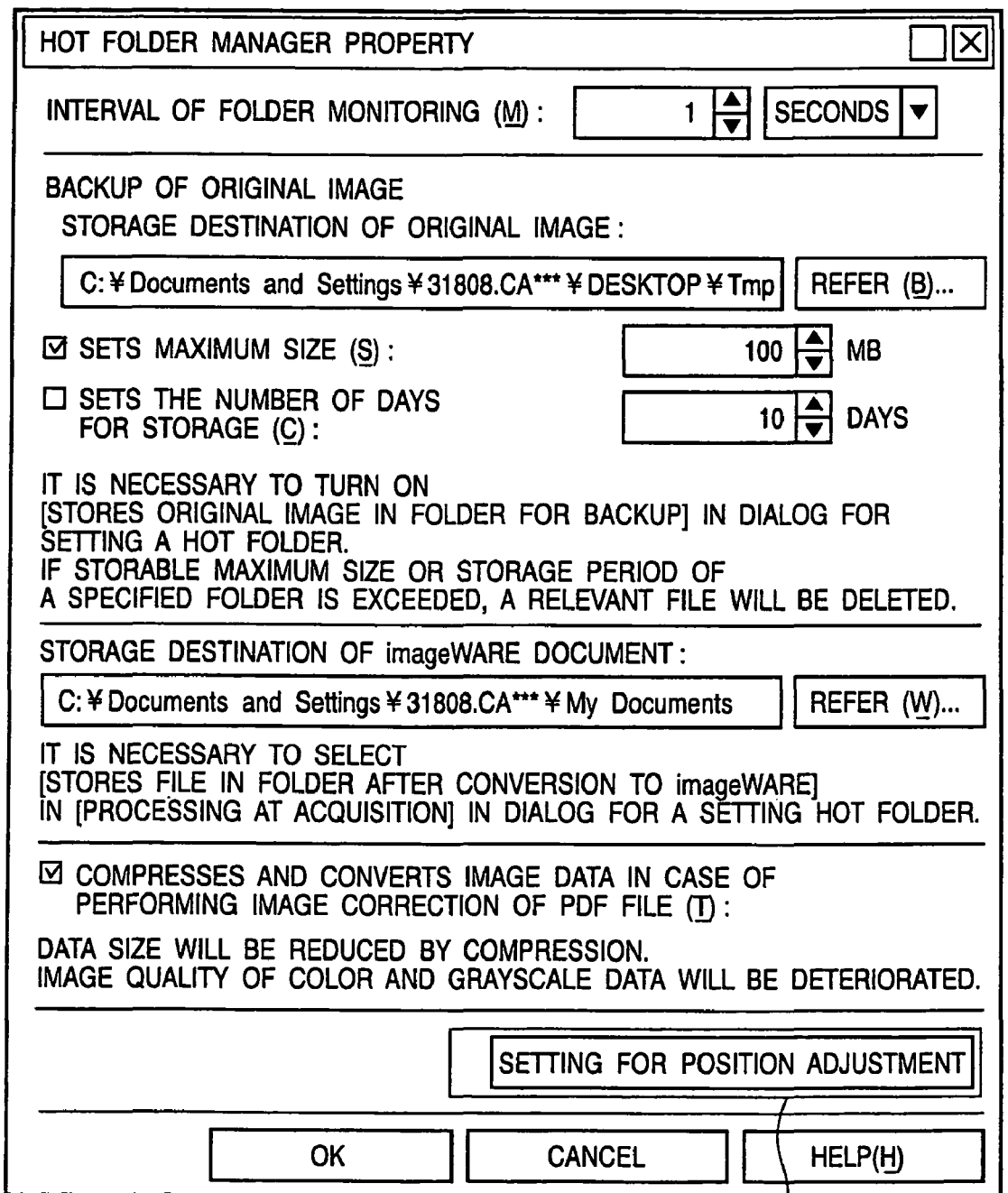
FIG. 25 shows an example of GUI for making detailed settings for shifting processing when performing image processing by means of a resident application for the hot folder which operates in cooperation with the hot folder in this embodiment.

FIG. 24 shows an example of GUI for performing image processing by means of an application referred to as a hot folder in this embodiment. According to this GUI, it is possible to set on/off of automatic image shifting processing with the use of the checkbox of a control 2404. The hot folder is constructed so that a resident application for detecting a file being thrown into the folder, which exists in a computer, executes predetermined processing in response to a file being thrown into the hot folder. The resident application for the hot folder forms a part of the configuration of the document editing application 2704. FIG. 25 shows an example of GUI for making detailed settings for shifting processing when performing image processing by means of a resident application for the hot folder (hereinafter simply referred to as a monitoring application) which operates in cooperation with the hot folder in this embodiment. In this embodiment, it is possible to set details of the shifting processing as one of various common setting items with the use of the hot folder. By pressing a button 2501 shown in FIG. 25, the GUI shown in FIG. 22 is displayed, and settings similar to usual settings can be made.

Figure 26:
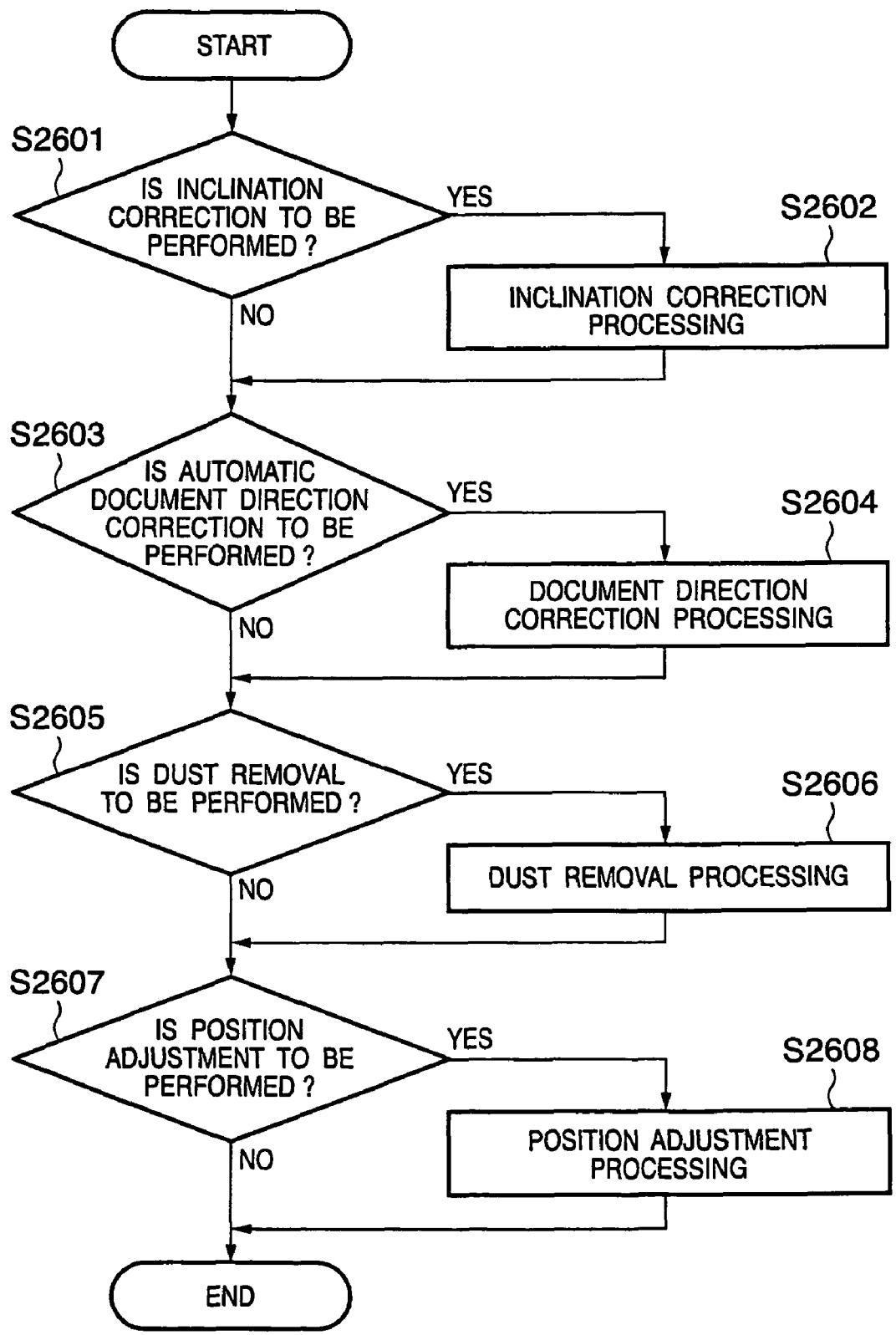
FIG. 26 is a flowchart for illustrating a procedure to be performed when automatic image processing is performed by means of the hot folder.

FIG. 26 is a flowchart for illustrating a procedure to be performed when automatic image processing is performed by means of the hot folder. First, when detecting that an image file has been thrown into a hot folder, the monitoring application forming a part of the configuration of the document editing application 2704 determines whether or not a setting for performing inclination correction is made for the hot folder (step S2601). This determination processing is performed based on whether or not a button 2401 is on in the GUI shown in FIG. 24. As a result, if the setting for performing the inclination correction is made (Yes), then the process proceeds to step S2602, and the inclination correction is not to be performed (No), then the process proceeds to step S2603.

At step S2602, the monitoring application activates the body of the document editing application 2704 and an electronic document writer 2702, and notifies the document editing application 2704 that inclination correction is to be performed when starting processing for acquiring the image file thrown into the hot folder as an electronic document. Then, the document editing application 2704 performs inclination correction processing. This inclination correction processing is processing for restoring horizontality and verticality of a document sheet which is slightly inclined because of inclination caused when it has been placed on a document glass for scanning or caused by paper feeding by an ADF, based on the direction of a character string, the inclination of ruled lines and the like. Since the inclination correction processing is a well-known technique, detailed description thereof will be omitted. Then, after the inclination correction processing, the process proceeds to step S2603.

At step S2603, the document editing application 2704 reads a setting for the hot folder via the monitoring application to determine whether or not it is set that automatic document direction correction processing is to be performed. This determination processing can be performed based on whether or not a button 2402 is on in the GUI shown in FIG. 24. As a result, if the automatic document direction correction processing is to be performed (Yes), then the process proceeds to step S2604. If the automatic correction processing is not to be performed (No), then the process proceeds to step S2605.

At step S2604, the document editing application 2704 performs the automatic document direction correction processing. This processing is processing for performing character recognition with the use of an OCR function and performing upside down correction or verticality adjustment when the document sheet is upside down or inclined by 90 degrees. This processing may also be called upside down correction. The automatic document direction correction processing is also a well-known technique, and therefore, detailed description thereof will be omitted. After the automatic correction processing, the process proceeds to step S2605.

At step S2605, the document editing application 2704 reads a setting for the hot folder via the monitoring application to determine whether or not it is set that dust removal processing is to be performed. This determination processing can be performed based on whether or not a button 2403 is on in the GUI shown in FIG. 24. As a result, if the dust removal processing is to be performed (Yes), then the process proceeds to step S2606. If the dust removal processing is not to be performed (No), then the process proceeds to step S2607.

At step S2606, the document editing application 2704 performs the dust removal processing. Thereby, even when a noise such as a slight "dot", is generated during scanning which does not exist on the original document, the dust removal processing removes any dot determined to be a dust from its size or the distance from other data. After the dust removal processing, the process proceeds to step S2607. The dust removal processing, which is generally called a black dot removal technique, is a well-known technique, and therefore, detailed description thereof will be omitted.

At step S2607, the document editing application 2704 reads a setting for the hot folder via the monitoring application to determine whether or not it is set that position adjustment processing is to be performed. This determination processing is performed based on whether or not a button 2403 is on in the GUI shown in FIG. 24. As a result, if it is set that the position adjustment processing is to be performed (Yes), then the process proceeds to step S2608, and the position adjustment processing is not to be performed (No), then the process ends.

At step S2608, the document editing application 2704 performs the position adjustment processing. Here, it is because the inclination correction processing and the document direction correction processing influence position adjustment that the position adjustment processing is performed last in the flowchart shown in FIG. 26. For example, when correction is performed for a punch hole portion, the position cannot be correctly adjusted because of its vertical reversal. Furthermore, if the dust removal processing is not performed before the position adjustment processing, the block selection may be influenced.

Whether or not to perform the inclination correction processing or the document direction correction processing not only may be set by a button of a GUI but also may be preset. Whether or not it is set that the position adjustment is to be performed may be added to the determination basis used at the determination in the inclination correction processing (step S2601), at the determination in the document direction correction processing (step S2603) or at the determination in the dust removal processing (step S2605).

As described above, the image shifting means according to this embodiment is capable of setting a threshold of a shift amount, so that unnecessary position adjustment is avoided by regarding such displacement that exceeds simple paper feeding displacement as a characteristic of a document sheet and treating it as a non-standard page. The reference position calculation means according to this embodiment is capable of determining a more accurate reference position by re-taking statistics after excluding data of such a non-standard page. Furthermore, the document area determination means according to this embodiment is capable of performing block selection of data included not in an entire image data but in a particular area by specifying the area.

Furthermore, the reference position calculation means calculates a reference position separately for each of the front and back sides in consideration of the difference between the front and back sides based on a binding margin. The image shifting means can shift the position based on the reference position calculated separately for each of the front and back sides.

Furthermore, in this embodiment, since such image processings as may influence block selection, such as skew correction processing and frame deletion, are performed prior to the position adjustment processing, the accuracy of the position correction processing can be enhanced.

Furthermore, the reference position calculation means is capable of not only taking position statistics of each of the front and back sides but also determining a reference position so that the positions for the front and back sides correspond to each other. For example, when switching between single-sided printing and double-sided printing is performed, suitable position adjustment can be performed for each of the front back sides by treating all single-sided chapter data as front side pages data and assuming, for double-sided chapter data, that front side data and back side data are alternately read. Furthermore, the reference position calculation means is capable of taking statistics of a standard position for each chapter and performing position adjustment based on the standard position for each chapter. Still furthermore, not only by the statistic processing but by manually inputting a standard position, alignment at any position can be also performed.

An embodiment has been described above in detail. However, the present invention can be embodied as a system, an apparatus, a method, a program or a storage medium (recording medium). Specifically, the present invention may be applied to a system configured by multiple equipment pieces or may be applied to an apparatus configured by one equipment piece.

There is also included a case where the present invention is achieved by supplying software programs for realizing the functions of the embodiment described above (in the embodiment, programs corresponding to flowcharts shown in the figures) is directly or remotely to a system or an apparatus, and a computer of the system or the apparatus reading and executing the supplied program code.

Accordingly, the program codes themselves, which are installed on a computer to realize the functions and processings of the present invention by the computer, also realize the present invention. That is, the present invention Includes the computer programs themselves for realizing the functions and processings of the present invention.

In this case, the programs may be in the form of object codes, programs to be executed by an interpreter, script data to be supplied to an OS, and the like.

As a recording medium for supplying the programs, there are, for example, a Floppy® disk, hard disk, optical disk, magneto-optical disk, MO, CD-ROM, CD-R, CD-RW, magnetic tape, non-volatile memory card, ROM, DVD (DVD-ROM and DVD-R) and the like.

In addition, as the method for supplying the programs, it is also possible to supply the programs by connecting to an Internet web page with the use of a browser of a client computer and downloading the computer programs of the present invention or a compressed file including an automatic installation function from the web page to a recording medium such as a hard disk. It is also possible to divide the program codes constituting the programs of the present invention into multiple files so that each file may be downloaded from a different web page. That is, a WWW server enabling multiple users to download a program file for realizing the functions and processings of the present invention is also included in the present invention.

Furthermore, it is also possible to encrypt the programs of the present invention, store them in a storage medium such as a CD-ROM and distribute the CD-ROM to users in order to enable a user who satisfies predetermined conditions to download key information for decryption from a web page via the Internet, use the key information to execute the encrypted programs, install them on a computer and realize them.

Furthermore, in addition to the case where the functions of the embodiment described above are realized by a computer executing the read programs, the functions of the embodiment described above can be also realized by an OS or the like, which is operating on the computer, performing a part or all of the actual processing based on instructions of the programs.

Furthermore, the functions of the embodiment described above can be also realized by the CPU, which is provided for a feature expansion board inserted in a computer or a feature expansion unit connected to the computer, performing a part or all of the actual processing based on instructions of the programs, which have been read from a recording medium and written in the memory provided for the feature expansion board or the feature expansion unit.

According to the present invention, it is possible to preferably perform image position correction processing after a paper document is scanned, and thereby, significantly reduce image correction processing cost before printing.

The accompanying drawings, which are incorporates in and constitute a part of the specification, illustrate embodiments of the invention and, together with the description, serve to explain the principle of the invention.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-023933, filed Jan. 31, 2005, which is hereby incorporated by reference herein in its entirety.

What is claimed is:

1. An image processing method for performing position adjustment of image data of multiple pages which has been inputted, the method comprising:
   a division step of dividing, for each page, the image data into multiple areas which include an object to be rendered, wherein the multiple areas are set as candidate areas for position adjustment;
   an adjustment value calculation step of calculating, for each page, an adjustment value for position adjustment, based on respective areas divided in the division step;
   a shift amount calculation step of calculating a shift amount of the image data on each page, based on a difference between the adjustment value of each page calculated in the adjustment value calculation step and a predetermined value for position adjustment;
   a shifting step of shifting the image data on each page based on the shift amount calculated in the shift amount calculation step;
   a designation step of designating an exclusion area that is excluded from the candidate areas in accordance with a user input;
   an exclusion area setting step of setting the exclusion area of the multiple areas, which is to be excluded from the multiple areas divided in the division step designated in the designation step; and
   a deletion step of deleting the exclusion area from the candidate areas, and updating the candidate areas included in the exclusion area set in the exclusion area setting step among the multiple areas, and setting candidate areas for image data position adjustment,
   wherein the adjustment value calculation step calculates the adjustment value according to the updated candidate areas updated in the deletion step,
   wherein the adjustment value calculation step has a circumscribed rectangle calculation step of calculating a location of a circumscribed rectangle around the updated candidate areas as the adjustment value, and
   wherein the predetermined value is calculated as an average value of locations of circumscribed rectangles for respective pages calculated in the circumscribed rectangle calculation step.

2. The image processing method according to claim 1, wherein the exclusion area setting step sets an area within a specified distance from the outline of each page of the image data as the exclusion area.

3. The image processing method according to claim 1, wherein the exclusion area setting step sets a range within a specified distance from any one of the upper and lower ends of the image data or within a specified distance from both of the upper and lower ends.

4. The image processing method according to claim 1, wherein the exclusion area setting step sets a range within a specified distance from any one of the right and left ends of the image data or within a specified distance from both of the right and left ends.

5. The image processing method according to claim 1, wherein the shifting step sets a threshold of the shift amount and shifts the image data if the amount of shift to the predetermined value calculated in the shift amount calculation step does not exceed the threshold.

6. The image processing method according to claim 5, wherein the shifting step sets a threshold separately for each of the vertical and horizontal directions, and
wherein, if the amount of vertical or horizontal shift to the predetermined value calculated by the shift amount calculation step exceeds the threshold, the shifting step does not shift the image data toward that direction.

7. The image processing method according to claim 1, further comprising:
a determination step of determining whether each page of the image data to be printed is a front side page or a back side page; and
a predetermined value calculation step of calculating a predetermined value separately for the front side and the back side, based on the result of the determination by the determination step,
wherein the shift amount calculation step calculates the shift amount of the image on each page based on a difference between the locations of the circumscribed rectangle for each page calculated by the circumscribed rectangle calculation step and the predetermined value calculated separately for each of the front side and the back side by the predetermined value calculation step.

8. The image processing method according to claim 7, wherein the determination step determines all images for which single-sided printing is set as those for the front side, based on print settings set for the image data.

9. The image processing method according to claim 7 or 8, wherein the predetermined value calculation step calculates the predetermined value for each subset of the images constituted by multiple pages, and
wherein the shift amount calculation step calculates the shift amount of each page based on a difference between the locations of the circumscribed rectangle for each page and the predetermined value for each subset calculated in the predetermined value calculation step.

10. The image processing method according to claim 9, wherein the subset corresponds to each chapter in the case where the image data are document images.

11. The image processing method according to claim 1, wherein the shift amount calculation step calculates the shift amount based on a difference between average values of the upper left coordinates and the lower right coordinates of the locations of the circumscribed rectangles and the predetermined value.

12. The image processing method according to claim 1, wherein the shift amount calculation step calculates the shift amount for each page based on a difference between the gravity center of the circumscribed rectangles of the respective page and the gravity center of an average circumscribed rectangle defined according to the predetermined value, so that each of the pages of the image data becomes center-aligned.

13. A non-transitory computer-readable storage medium storing a computer program for executing on a computer the image processing method according to claim 1.

14. An image processing apparatus for performing position adjustment of image data of multiple pages which has been inputted; the apparatus comprising:
division means for dividing, for each page, the image data into multiple areas which include an object to be rendered, wherein the multiple areas are set as candidate areas for position adjustment;
adjustment value calculation means for calculating, for each page, an adjustment value for position adjustment, based on respective areas divided by the division means;
shift amount calculation means for calculating a shift amount of the image data on each page, based on a difference between the adjustment value of each page calculated by the adjustment value calculation means and a predetermined value for position adjustment;
shifting means for shifting the image data on each page based on the shift amount calculated by the shift amount calculation means;
a designation means for designating an exclusion area that is excluded from the candidate areas in accordance with a user input;
exclusion area setting means for setting the exclusion area designated by the designation means; and
deletion means for deleting the exclusion area from the candidate areas, and updating the candidate areas,
wherein the adjustment value calculation means calculates the adjustment value with the use of the updated candidate areas updated by the deletion means,
wherein the adjustment value calculation means calculates a location of a circumscribed rectangle around the updated candidate areas as the adjustment value, and
wherein the predetermined value is calculated as an average value of locations of circumscribed rectangles for respective pages calculated by the adjustment value calculation means.

15. The image processing apparatus according to claim 14, wherein the exclusion area setting means sets an area within a specified distance from the outline of each page of the image data as the exclusion area.

16. The image processing apparatus according to claim 14, wherein the exclusion area setting means sets a range within a specified distance from any one of the upper and lower ends of the image data or within a specified distance from both of the upper and lower ends.

17. The image processing apparatus according to claim 14, wherein the exclusion area setting means sets a range within a specified distance from any one of the right and left ends of the image data or within a specified distance from both of the right and left ends.

18. The image processing apparatus according to claim 14, wherein the shifting means sets a threshold of the shift amount and shifts the image data if the amount of shift to the predetermined value calculated by the shift amount calculation means does not exceed the threshold.

19. The image processing apparatus according to claim 18, wherein the shifting means sets a threshold separately for each of the vertical and horizontal directions, and
wherein if the amount of vertical or horizontal shift to the predetermined value calculated by the shift amount calculation means exceeds the threshold, the shifting means does not shift the image data toward that direction.

20. The image processing apparatus according to claim 18, wherein the shift amount calculation means calculates multiple shift amounts of the images with the use of multiple standard values to which a priority sequence is given, and
wherein the shifting means shifts the images based on the amount of shift to a standard value which does not exceed the threshold and is given the highest priority, among the multiple shift amounts.

21. The image processing apparatus according to claim 14, further comprising:
- determination means for determining whether each page of the image data to be printed is a front side page or a back side page; and
- predetermined value calculation means for calculating a predetermined value separately for the front side and the back side, based on the result of the determination by the determination means;
- wherein the shift amount calculation means calculates the shift amount of the image on each page based on a difference between the locations of the circumscribed rectangle for each page calculated by the circumscribed rectangle calculation means and the predetermined value calculated separately for each of the front side and the back side by the predetermined value calculation means.

22. The image processing apparatus according to claim 21, wherein the determination means determines all images for which single-sided printing is set as those for the front side, based on print settings set for the image data.

23. The image processing apparatus according to claim 21 or 22,
- wherein the predetermined value calculation means calculates the predetermined value for each subset of the images constituted by multiple pages, and
- wherein the shift amount calculation means calculates the shift amount of each page based on a difference between the locations of the circumscribed rectangle for each page and the predetermined value for each subset calculated by the predetermined value calculation means.

24. The image processing apparatus according to claim 23, wherein the subset corresponds to each chapter in the case where the image data are document images.

25. The image processing apparatus according to claim 14, wherein the shift amount calculation means calculates the shift amount based on a difference between average values of the upper left coordinates and the lower right coordinates of the locations of the circumscribed rectangles and the predetermined value.

26. The image processing apparatus according to claim 14, further comprising:
- preprocessing means for performing image processing for performing correction of inclination of the image data and correction of other input condition of the document sheet,
- wherein the division means divides, for each page, the image data for which the image processing has been performed by the pre-processing means into areas.

27. The image processing apparatus according to claim 14, wherein the shift amount calculation means calculates the shift amount for each page based on a difference between the gravity center of the circumscribed rectangles of the respective page and the gravity center of an average circumscribed rectangle defined according to the predetermined value, so that each of the pages of the image data becomes center-aligned.

* * * * *